(12) United States Patent  
Lee

(10) Patent No.: US 12,554,438 B2
(45) Date of Patent: Feb. 17, 2026

(54) MEMORY DEVICE AND COMPUTING SYSTEM INCLUDING THE SAME

(71) Applicant: Samsung Electronics Co., Ltd., Suwon-si (KR)

(72) Inventor: Yeonjin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 31 days.

(21) Appl. No.: 18/408,741

(22) Filed: Jan. 10, 2024

(65) Prior Publication Data

US 2025/0053336 A1   Feb. 13, 2025

(30) Foreign Application Priority Data

Aug. 9, 2023   (KR) .................. 10-2023-0103877

(51) Int. Cl.
*G06F 3/06*   (2006.01)

(52) U.S. Cl.
CPC .......... *G06F 3/0659* (2013.01); *G06F 3/0607* (2013.01); *G06F 3/0631* (2013.01); *G06F 3/0656* (2013.01); *G06F 3/0679* (2013.01)

(58) Field of Classification Search
CPC ...... G06F 3/0607; G06F 3/061; G06F 3/0631; G06F 3/0656; G06F 3/0659; G06F 3/0679; G06F 3/0688
See application file for complete search history.

(56) References Cited

U.S. PATENT DOCUMENTS

| | | | |
|---|---|---|---|
| 6,928,470 | B1 | 8/2005 | Hamlin |
| 8,984,208 | B2 | 3/2015 | Lee |
| 10,037,167 | B2 | 7/2018 | Kwon et al. |
| 10,157,023 | B2 | 12/2018 | Moon et al. |
| 11,513,839 | B2 | 11/2022 | Brewer |
| 2021/0349840 | A1 | 11/2021 | Kumar et al. |
| 2022/0114098 | A1 | 4/2022 | Das et al. |
| 2023/0100573 | A1 | 3/2023 | Jeong et al. |
| 2025/0070906 | A1* | 2/2025 | Zhou ............... H04Q 11/00 |

* cited by examiner

*Primary Examiner* — Yong J Choe
(74) *Attorney, Agent, or Firm* — Muir Patent Law, PLLC

(57) ABSTRACT

A memory device configured to connect to a plurality of hosts through an interconnect device and to communicate with the plurality of hosts by a compute express link (CXL) protocol includes a command scheduler, a memory, and a priority scheduler. The command scheduler schedules commands included in requests from the plurality of hosts. The memory generates internal data by performing memory operations corresponding to the scheduled commands. The priority scheduler designates a first host from the plurality of hosts as a priority host based on attribute information of each of the plurality of hosts and generates an output data by rearranging the internal data such that a data requested by the first host is output with priority.

20 Claims, 19 Drawing Sheets

151

| HOST ID | ACCESS COUNT | ALLOCATION |
|---------|--------------|------------|
| HIDa    | CV1          | ALC1       |
| HIDb    | CV2          | ALC2       |
| HIDc    | CV3          | ALC3       |

↑ 152  ↑ 153  ↑ 154

MEMORY DEVICE AND COMPUTING SYSTEM INCLUDING THE SAME

CROSS-REFERENCE TO RELATED APPLICATION

This U.S. non-provisional application claims priority under 35 USC § 119 to Korean Patent Application No. 10-2023-0103877, filed on Aug. 9, 2023, in the Korean Intellectual Property Office (KIPO), the disclosure of which is incorporated by reference herein in its entirety.

BACKGROUND

1. Technical Field

Example embodiments relate generally to semiconductor integrated circuits, and more particularly to a memory device capable of enhancing performance and computing system including the same.

2. Discussion of the Related Art

A system that performs data processing (e.g., a computing system may include a central processing unit (CPU), a memory device, input-output devices, and a root complex that transmits information between devices constituting the system, and the like. As an example, the devices capable of configuring the computing system may transmit and receive requests and responses based on various types of protocols such as peripheral component interconnect express (PCIe), compute express link (CXL), and the like.

A computing system may include a memory device, and the memory device may be shared by one or more hosts. In some occasions, data may be transferred to a specific host of the plurality of hosts.

SUMMARY

Some example embodiments may provide a memory device capable of enhancing performance by performing data scheduling.

Some example embodiments may provide a computing system including a memory device capable of enhancing performance by performing data scheduling.

According to example embodiments, a memory device configured to connect to a plurality of hosts through an interconnect device and to communicate with the plurality of hosts by a compute express link (CXL) protocol includes a command scheduler, a memory and a priority scheduler. The command scheduler schedules commands included in requests from the plurality of hosts. The memory generates internal data by performing memory operations corresponding to the scheduled commands. The priority scheduler designates a first host from the plurality of hosts as a priority host based on attribute information of each of the plurality of hosts and generates output data by rearranging the internal data such that a data requested by the first host is output with priority.

According to example embodiments, a computing system includes an interconnect device, a plurality of memory devices connected to the interconnect device and a plurality of hosts connected to the interconnect device. The plurality of hosts generate requests for access to the plurality of memory devices. The plurality of memory devices communicate with the plurality of host by a compute express link (CXL) protocol. Each of the plurality of memory devices includes a command scheduler, a memory and a priority scheduler. The command scheduler schedules commands included in requests from the plurality of hosts. The memory generates internal data by performing memory operations corresponding to the scheduled commands. The priority scheduler designates a first host from the plurality of hosts as a priority host based on attribute information of each of the plurality of hosts and generates an output data by rearranging the internal data such that a data requested by the first host is output with priority.

According to example embodiments, a memory device configured to connect to a plurality of hosts through an interconnect device and to communicate with the plurality of hosts by a compute express link (CXL) protocol, includes a command scheduler, a memory and a priority scheduler. The command scheduler schedules commands included in requests from the plurality of hosts. The memory generates internal data by performing memory operations corresponding to the scheduled commands. The priority scheduler designates a first host from the plurality of hosts as a priority host based on attribute information of each of the plurality of hosts and generates an output data by rearranging the internal data such that a data requested by the first host is output with priority. The priority scheduler includes a host information register, a priority mode selector and an arbiter. The host information register stores the attribute information of each of the plurality of hosts based on information in received packets. The priority mode selector generates a priority mode signal based on the attribute information stored in the host information register. The arbiter generates the output data by rearranging the internal data in response to the priority mode signal.

In the memory device and the computing system according to example embodiments, the priority scheduler may rearrange internal data provided from a memory region based on attribute information of the hosts connected to the CXL switch such that data requested by a host designated as the priority host is output with priority. Therefore, the memory device and the computing system may reduce a load of the CXL switch and prevent degradation of performance of the host designated as the priority host.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EMBODIMENTS

Figure 1:
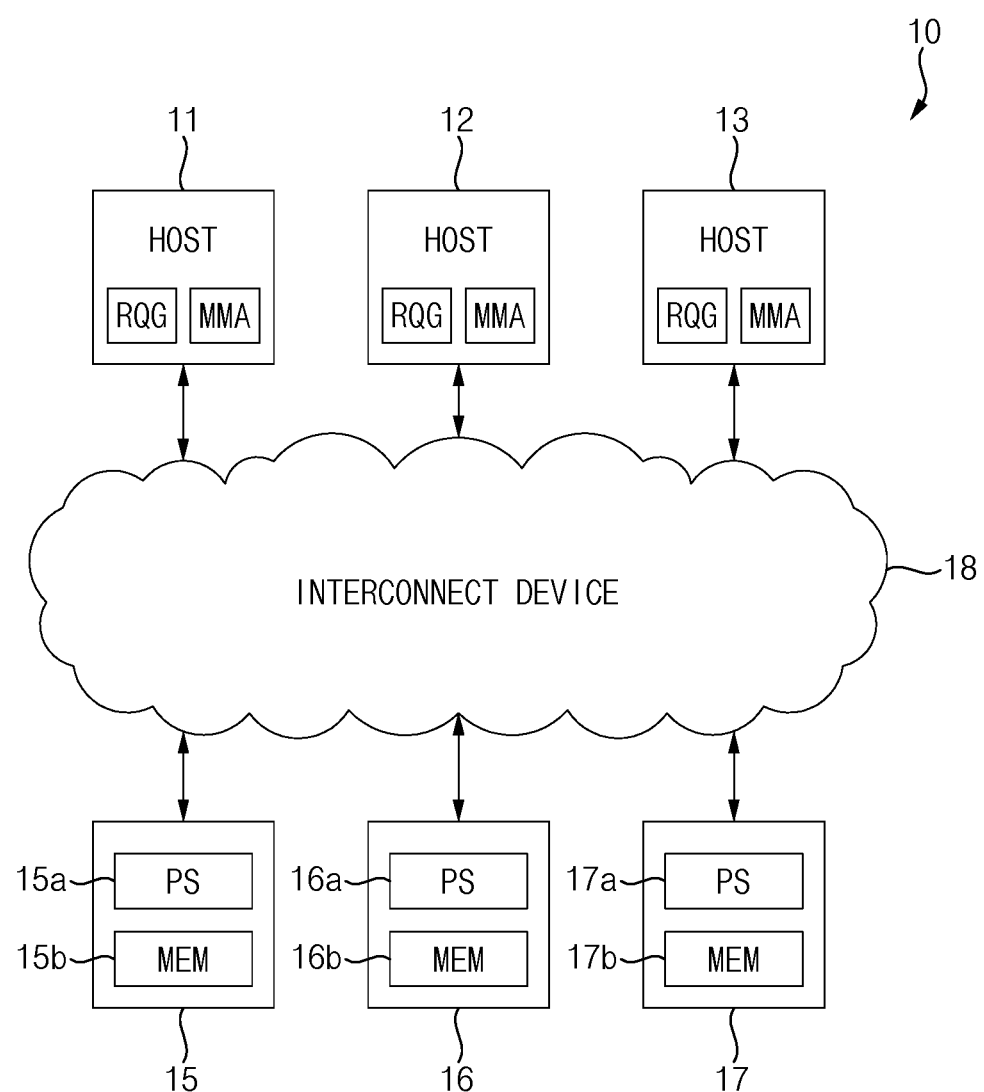
FIG. 1 is block diagram illustrating a computing system according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is block diagram illustrating a computing system according to example embodiments.

Referring to FIG. 1, a computing system 10 may be variously referred to as a data processing system or the like, and may include one or more devices. As an example, the computing system 10 may include one or more memory devices and hosts that generate requests to request access (e.g., read data or write data) to the memory devices. Since devices requesting data access operate as hosts for memory devices, the devices may be referred to as hosts or master devices. Meanwhile, memory devices may be referred to as slave devices in terms of providing services such as provision or storage of data to the hosts.

For example, the computing system 10 may include a plurality of hosts 11, 12 and 13 and a plurality of memory devices 15, 16 and 17. Although the computing system 10 including three hosts and three memory devices is illustrated in FIG. 1, example embodiments are not limited thereto and various numbers of devices may be included in the computing system 10.

Each of the plurality of memory devices 15, 16 and 17 may include or be one of various types of memory, and as an example, each memory device may include or be a solid state drive (SSD), flash memory, and magnetic RAM (MRAM), ferroelectric RAM (FRAM), phase change RAM (PRAM) and resistive RAM (RRAM). However, example embodiments need not be limited to this, and each of the plurality of memory devices 15, 16 and 17 may include or be DDR SDRAM (Double Data Rate Synchronous Dynamic Random Access Memory), LPDDR (Low Power Double Data Rate), and dynamic random access memory (DRAM) such as SDRAM, graphics double data rate (GDDR) SDRAM, and Rambus Dynamic Random Access Memory (RDRAM). In addition, each of the plurality of memory devices 15, 16 and 17 may include or be a memory module or a chiplet. The memory devices 15, 16, and 17 may have the same type and/or number of memory chips as each other, or may have different types and/or numbers of memory chips as each other, and each memory device 15, 16, and 17, may be or include a semiconductor package, which includes terminals for connecting to a controller.

The devices included in computing system 10 may communicate with each other through an interconnect device (or link) 18 that supports one or more protocols. Each of the devices may include internal components that perform protocol-based communication supported by the interconnect device 18. As an example, the protocol may include PCIe Peripheral Component Interconnect Express (PCIe) protocol, compute express link (CXL) protocol, XBus protocol, NVLink protocol, Infinity Fabric protocol, cache coherent interconnect for accelerators (CCIX) protocol, coherent accelerator processor interface (CAPI). At least one selected protocol may be applied to the interconnect device 18. Hereinafter, example embodiments will be described mainly based on communication based on the CXL protocol, but various other protocols may be applied in addition to the above protocols without being limited thereto.

Although the interconnect device 18 between the plurality of hosts 11, 12 and 13 and the plurality of memory devices 15, 16 and 17 is briefly illustrated for convenience of description and illustration, the computing system 10 may include a root complex connected to a plurality of devices through root ports, such that the plurality of hosts 11, 12 and 13 and the plurality of memory devices 15, 16 and 17 may communicate through the root complex. For example, the root complex may manage transactions between the plurality of hosts 11, 12 and 13 and the plurality of memory devices 15, 16 and 17. In addition, in some example embodiments, mutual communication may be performed based on various other configurations and functions according to the CXL standard, and as an example, configurations such as a flex bus and a switch disclosed in the CXL standard. In this case, the plurality of hosts 11, 12 and 13 and the plurality of memory devices 15, 16 and 17 may be CXL-compatible hosts and memory devices. Also, at least some of the plurality of memory devices 15, 16 and 17 may be connected to at least one of the plurality of hosts 11, 12 and 13, through a predetermined protocol-based bridge (e.g., PCI bridge) that controls a communication path.

According to embodiments, each of the plurality of hosts 11, 12 and 13 may include or be one of various types of devices. For example, in one embodiment, each of the plurality of hosts 11, 12 and 13 is a main processor and controls a central processing unit (CPU), graphic processing unit (GPU), or neural processing unit (NPU), a component providing fixed functions such as an intellectual property (IP) core, and a reconfigurable component such as a field programmable gate array (FPGA), and peripheral devices such as network interface cards (NICs).

According to example embodiments, at least one of the plurality of memory devices 15, 16 and 17 may be shared by the plurality of hosts 11, 12 and 13. For example, at least one of the plurality of memory devices 15, 16 and 17 may be a pooled memory shared by plurality of hosts 11, 12 and 13 and commands executed by the plurality of hosts 11, 12 and 13 may be stored in at least one of the plurality of memory devices 15, 16 and 17, data input for calculation processing may be stored in the plurality of memory devices 15, 16 and 17, and/or processing results may be stored in the plurality of memory devices 15, 16 and 17.

Each of the plurality of hosts 11, 12 and 13 may include a request generator RQG and a memory allocator MMA, respectively. The memory allocator MMA allocates a memory region that is exclusively accessed by a host to prevent memory collisions caused by different hosts and to maintain consistency of data stored in the memory. The request generator RQG may generate requests for requesting a memory access such as a write operation and a read operation based on an address corresponding to the memory region exclusively allocated to each host.

Each of plurality of memory devices 15, 16 and 17 may include a respective one of a plurality of priority schedulers PSs 15a, 16a and 17a and a respective one of a plurality of memories MEMs 15b, 16b and 17b.

The respective one of the memories 15b, 16b and 17b may generate internal data by performing memory operations corresponding to commands included in the requests from the plurality of hosts 11, 12 and 13 and the respective one of the priority schedulers 15a, 16a and 17a may designate at least one host (i.e., a first host) from the plurality of hosts 11, 12 and 13 as a priority mode (e.g., a priority access host, or simply a priority host) based on attribute information of each of the plurality of hosts 11, 12 and 13, and may generate an output data by rearranging the internal data such that a data requested by a host in the priority mode (i.e., the first host) is output with priority. The memory operations may include one or more operations performed in the memory based on one or more commands received from an external device (e.g., a memory controller). For example, one or more memory operations may include read operation, write operation, refresh operation and precharge operation. In addition, the memory operations may include one or more computations performed in a memory device having a processing-in-memory (PIM) feature. However, one or more embodiments of the disclosure are not limited thereto, and may include other memory operations executable in various types of memory devices.

The at least one host in the priority mode may be a host requesting a high through output or a host that performs complex data computing operation, for example.

Figure 2:
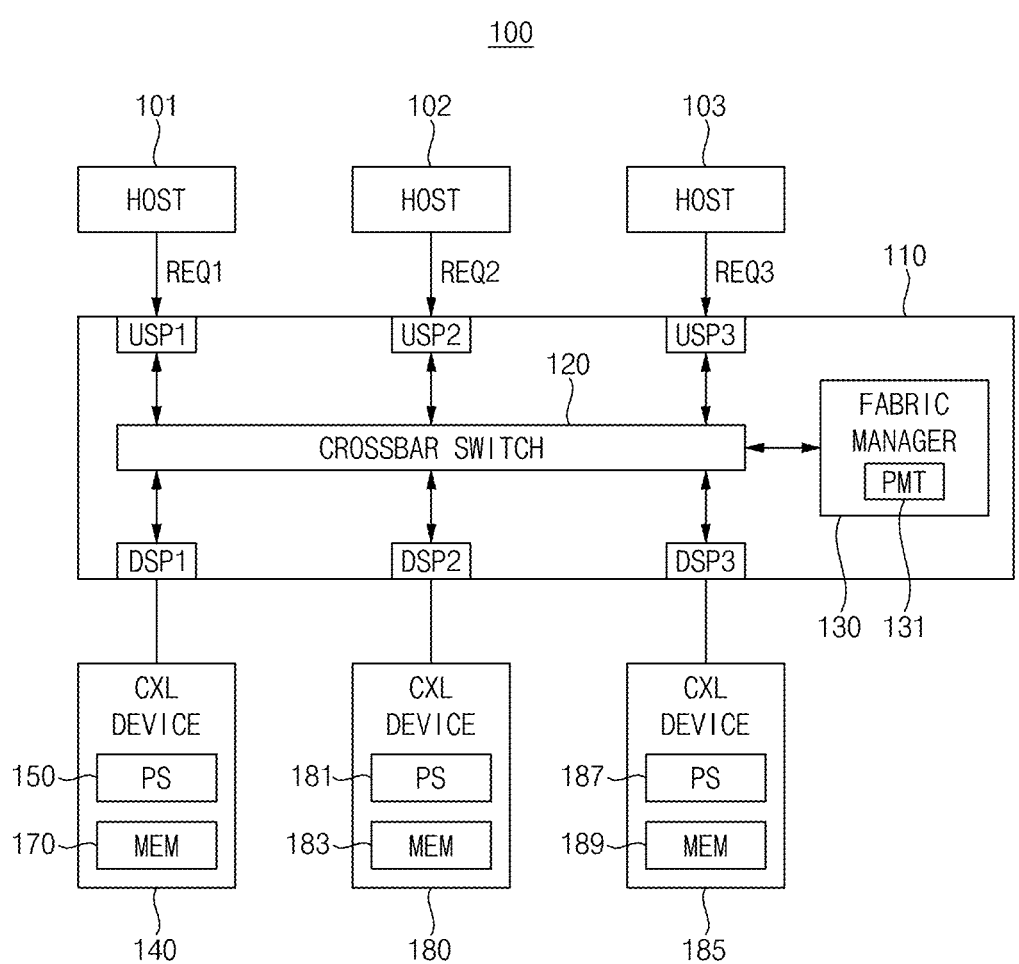
FIG. 2 is block diagram illustrating a computing system according to example embodiments.

FIG. 2 is block diagram illustrating a computing system according to example embodiments.

Referring to FIG. 2, a computing system 100 may include a plurality of hosts 101, 102 and 103, a plurality of CXL devices 140, 180 and 185 and a CXL switch 110. Although the computing system 10 including three hosts and three memory devices is illustrated in FIG. 2, example embodiments are not limited thereto and various numbers of devices may be included in the computing system 100.

The plurality of hosts 101, 102 and 103 and the plurality of CXL devices 140, 180 and 185 may communicate with each other based on CXL protocol through the CXL switch 110. The CXL switch 110 may correspond to the interconnect device 18 in FIG. 1 and the plurality of CXL devices 140, 180 and 185 may correspond to the plurality of memory devices 15, 16 and 17 in FIG. 1. That is, each of the plurality of CXL devices 140, 180 and 185 may be referred to as a memory device.

The CXL switch 110 may include upstream ports USP1, USP2 and USP3 coupled to the plurality of hosts 101, 102 and 103, respectively, downstream ports DSP1, DSP2 and DSP3 coupled to the plurality of CXL devices 140, 180 and 185, respectively, a crossbar switch 120 and a fabric manager 130.

The crossbar switch 120 may connect at least one of the upstream ports USP1, USP2 and USP3 to at least one of the downstream ports DSP1, DSP2 and DSP3 and the fabric manager 130 may manage a port map table PMT 131 including port connection information on connections between the upstream ports USP1, USP2 and USP3 and the downstream ports DSP1, DSP2 and DSP3. Therefore, at least a portion of the plurality of CXL devices 140, 180 and 185 may be shared by the plurality of hosts 101, 102 and 103 through the crossbar switch 120 and the fabric manager 130 may manage connection relationships between the plurality of hosts 101, 102 and 103 and the plurality of CXL devices 140, 180 and 185.

Each of the plurality of CXL devices 140, 180 and 185 may include a respective one of a plurality of priority schedulers 150, 181 and 187 and a respective one of a plurality of memories 170, 183 and 189.

The respective one of the memories 170, 183 and 189 may generate internal data by performing memory operations corresponding to commands included in requests REQ1, REQ2 and REQ3 from the plurality of hosts 101, 102 and 103, and the respective one of the priority schedulers 150, 181 and 187 may designate at least one host (i.e., a first host) from the plurality of hosts 101, 102 and 103 as a priority mode (e.g., priority host) based on attribute information of each of the plurality of hosts 101, 102 and 103, and may generate an output data by rearranging the internal data such that a data requested by the at least one host having the priority mode (i.e., the first host) is output with priority.

The attribute information of each of the plurality of hosts 101, 102 and 103 may include access count based on respective one of the requests REQ1, REQ2 and REQ3 to the plurality of CXL devices 140, 180 and 185, and (memory) allocation amount based on a device logical address with respect to each of the memories 170, 183 and 189, included in respective one of the requests REQ1, REQ2 and REQ3.

Figure 3:
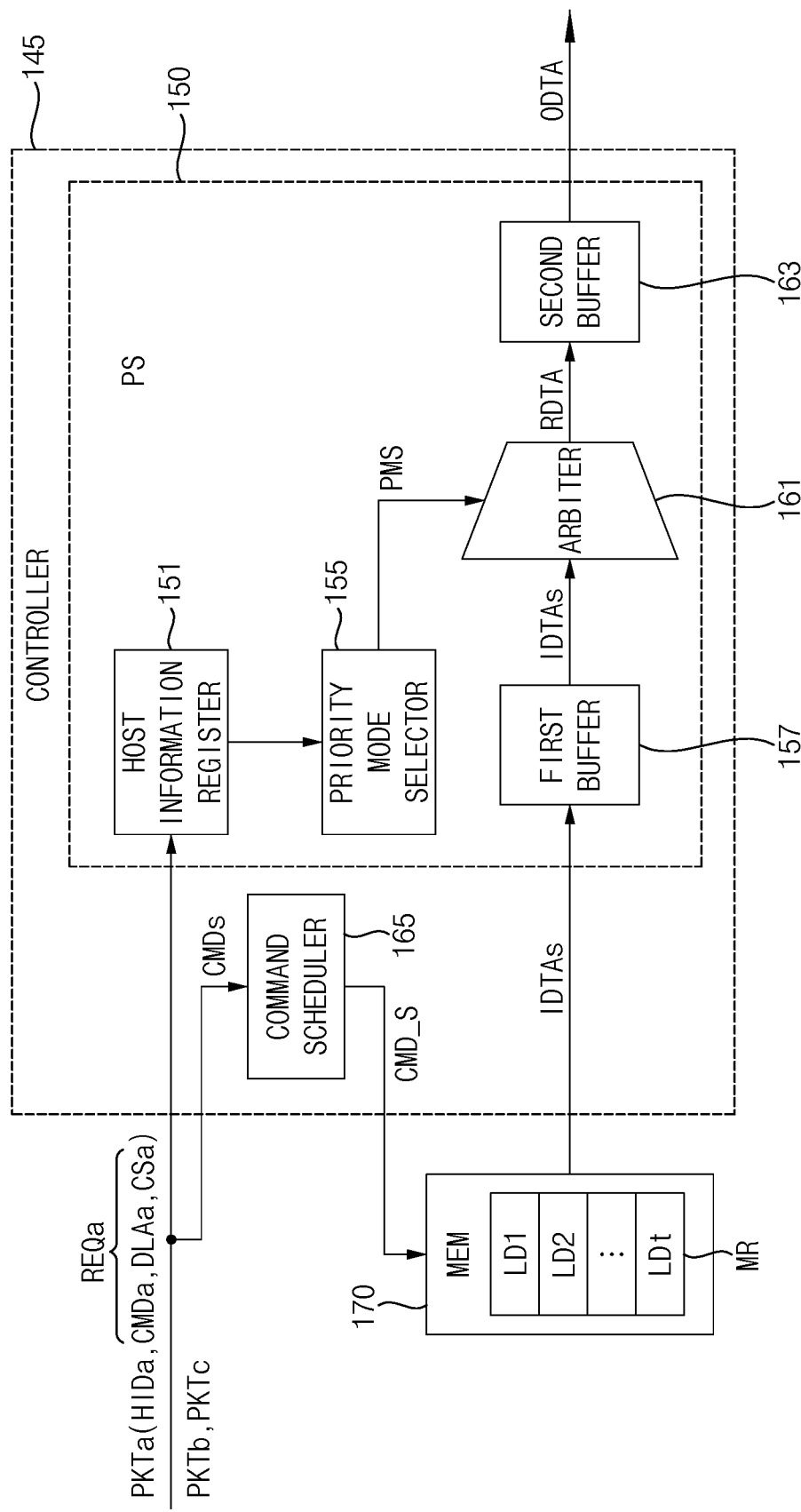
FIG. 3 is block diagram illustrating an example of a CXL device in the computing system of FIG. 2 according to example embodiments.

FIG. 3 is block diagram illustrating an example of a CXL device in the computing system of FIG. 2 according to example embodiments.

In FIG. 3, a configuration of the CXL device 140 of the plurality of CXL devices 140, 180 and 185 is illustrated and each configuration of the CXL devices 180 and 185 may be substantially the same as the configuration of the CXL device 140.

Referring to FIG. 3, the CXL device 140, which may also be described as a CXL-compatible device, compatible and configured for communications using the CXL standard, may include a controller 145 and a memory 170.

The controller 145 may receive packets PKTa, PKTb and PKTc from all or a portion of the plurality of hosts 101, 102 and 103 in FIG. 2.

The packet PKTa may include a host identifier HIDa and the request REQa and the request REQa may include a command CMDa, a device logical address DLAa and a chip selection signal CSa. A host issuing the packet PKTa may be identified by the host identifier HIDa.

The packet PKTb may include a corresponding host identifier and a corresponding request, and the packet PKTc may include a corresponding host identifier and a corresponding request.

The memory 170 may include a memory region MR that is divided into a plurality of logical devices LD1, LD2, . . . , LDt. Here, t may be an integer greater than two.

The plurality of logical devices LD1, LD2, ..., LDt may be referred to as a plurality of logical (memory) regions.

The controller 145 may include a priority scheduler 150 and a command scheduler 165, and the priority scheduler 150 may include a host information register 151, a priority mode selector 155, a first buffer 157, an arbiter 161 and a second buffer 163. Components described herein and depicted as blocks, such as the various schedulers, controllers, selectors, etc., may be implemented with hardware, such as transistors and various passive and active circuit components such as logic circuits, and additional firmware or software.

The command scheduler 165 may provide scheduled commands CMD_S to the memory 170 by scheduling commands CMDs included in the packets PKTa, PKTb and PKTc, and the memory 170 may generate internal data IDTAs by performing memory operations corresponding to the scheduled commands CMD_S and may provide the internal data IDTAs to the first buffer 157.

The host information register 151 may receive the packets PKTa, PKTb and PKTc, and may store attribute information of each of all or some of the plurality of hosts 101, 102 and 103 based on the packets PKTa, PKTb and PKTc.

The priority mode selector 155 may designate a first host from the plurality of hosts 101, 102 and 103 as the priority host based on the attribute information of each of all or some of the plurality of hosts 101, 102 and 103, which is stored in the host information register 151, may generate a priority mode signal PMS indicating that the first host is designated as the priority host and may provide the priority mode signal PMS to the arbiter 161. By including the priority mode selector 155 in the memory 170, the power and load of a switch such as a CXL switch 110 can be reduced.

The arbiter 161 may receive the internal data IDTAs from the first buffer 157, may generate rearranged data RDTA by rearranging the internal data IDTAs in response to the priority mode signal PMS and may provide the rearranged data RDTA to the second buffer 163.

The second buffer 163 may receive the rearranged data RDTA and may provide the all or some of the plurality of hosts 101, 102 and 103 with the rearranged data RDTA by a receiving order as an output data ODTA.

For example, the priority scheduler 150 may designate a first host from the plurality of hosts 101, 102 and 103 as the priority host based on the attribute information of each the plurality of hosts 101, 102 and 103 and may generate the output data ODTA by rearranging the internal data IDTAs such that data requested by the first host is output with priority (e.g., is output first).

Figures 4, 5:
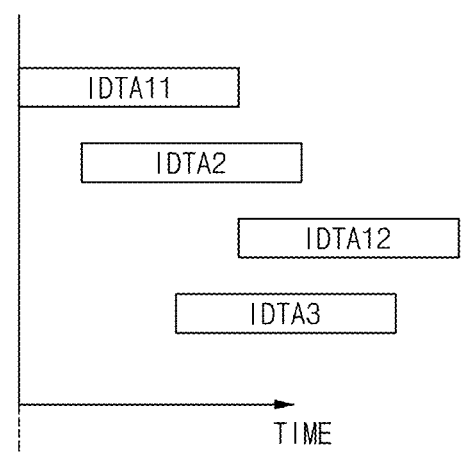
FIG. 4 illustrates an example of the host information register in the CXL device of FIG. 3 according to example embodiments.
FIG. 5 illustrates an example of internal data provided to the controller from the memory in the CXL device in FIG. 3.

FIG. 4 illustrates an example of the host information register in the CXL device of FIG. 3 according to example embodiments.

Referring to FIG. 4, the host information register 151 may include a first column 152, a second column 153 and a third column 154.

A host identifier HOST ID that identifies plurality of hosts 101, 102 and 103 may be stored in the first column 152, access count based on requests included in the packets PKTa, PKTb and PKTc may be stored in the second column 153 and allocation amount ALLOCATION based on device logical addresses included in the PKTa, PKTb and PKTc may be stored in the third column 154.

With respect to a host having a host identifier HIDa, an access count CV1 and an allocation amount ALC1 as the attribute information may be stored in the host information register 151, with respect to a host having a host identifier HIDb, an access count CV2 and an allocation amount ALC2 as the attribute information may be stored in the host information register 151 and with respect to a host having a host identifier HIDc, an access count CV3 and an allocation amount ALC3 as the attribute information may be stored in the host information register 151. The access count may refer, for example, to a number of accesses that will be needed for a request or host, and the allocation amount may refer to an amount of resources (e.g., memory space) needed for the request. That is, the access count may indicate a number of accesses required by respective one of the requests and the allocation amount may refer to (i.e., may indicate) an amount of logical memory regions allocated for respective one of the requests. The logical memory regions may correspond to the plurality of logical devices LD1, LD2, ..., LDt in FIG. 3. For example, a logical memory region may include one or more memory cells among a plurality of memory cells in a memory device.

The priority mode selector 155 may designate (i.e., select) a first host from the plurality of hosts 101, 102 and 103 as the priority host based at least one of a maximum value of the access counts CV1, CV2 and CV3 of the plurality of hosts 101, 102 and 103 and a maximum value of the allocation amounts ALC1, ALC2 and ALC3 on the plurality of hosts 101, 102 and 103 during a reference time interval. For example, when the access count CV1 is the maximum of the access counts CV1, CV2 and CV3 and the allocation amount ALC1 is the maximum of the allocation amounts ALC1, ALC2 and ALC3, the priority mode selector 155 may designate the host 101 from the plurality of hosts 101, 102 and 103 as the priority mode. An algorithm may be used to determine which host is the priority host based on a combination of the access counts and allocation amounts for the respective hosts.

FIG. 5 illustrates an example of internal data provided to the controller from the memory in the CXL device in FIG. 3.

In FIG. 5, it is assumed that the plurality of hosts 101, 102 and 103 transmit requests associated with read data to the CXL device 140 in an order of the host 102, the host 101 and the host 103.

In addition, it is assumed that an internal data IDTA11 is requested by the host 101, an internal data IDTA2 is requested by the host 102, an internal data IDTA12 is requested by the host 101 and an internal data IDTA3 is requested by the host 103.

Figure 6:
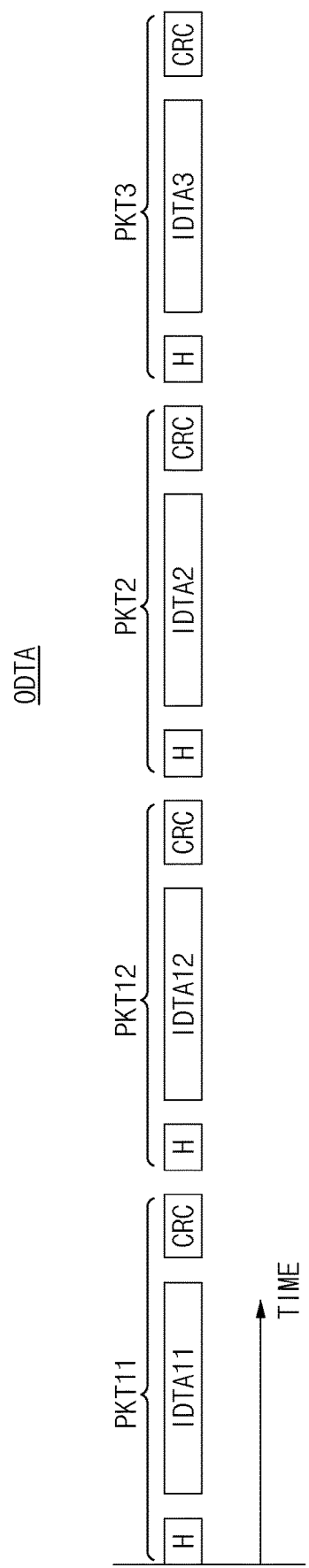
FIG. 6 illustrates an example of an output data output from the controller in FIG. 3.

Referring to FIG. 5, the CXL device 140 may provide the internal data IDTA11, IDTA2, IDTA12 and IDTA3 according to an order requested by the plurality of hosts 101, 102 and 103. FIG. 6 illustrates an example of an output data output from the controller in FIG. 3.

In FIG. 6, it is assumed that the plurality of hosts 101, 102 and 103 transmit requests associated with read data to the CXL device 140 in an order of the host 101, the host 102, the host 101 and the host 103.

In addition, it is assumed that an internal data IDTA11 is requested by the host 101, an internal data IDTA2 is requested by the host 102, an internal data IDTA12 is requested by the host 101 and an internal data IDTA3 is requested by the host 103, and the host 101 is designated as the priority host.

Referring to FIGS. 3 and 6, the CXL device 140 may provide the internal data IDTA11, IDTA2, IDTA12 and IDTA3 to the first buffer 157 according to an order requested by the plurality of hosts 101, 102 and 103 and the arbiter 161 generates rearranged data IDTA11, IDTA12, IDTA2 and IDTA3 by rearranging the internal data IDTA11, IDTA2, IDTA12 and IDTA3 received from the first buffer 157 based on the priority mode signal PMS such that the IDTA11 and IDTA12 requested by the host 101 is output with priority. The CXL device may store the rearranged data IDTA11, IDTA12, IDTA2 and IDTA3 in the second buffer 163.

The second buffer 163 may provide the rearranged data IDTA11, IDTA12, IDTA2 and IDTA3 to the plurality of hosts 101, 102 and 103 as the output data ODTA, in the rearranged order.

In FIG. 6, packets PKT11 and PKT12 may be provided to the host 101 through the CXL switch 110, the packet PKT11 may include a header H, the internal data IDTA11 and a cyclic redundancy check data CRC, and the packet PKT12 may include a header H, the internal data IDTA12 and a cyclic redundancy check data CRC. A packet PKT2 may be provided to the host 102 through the CXL switch 110, the packet PKT2 may include a header H, the internal data IDTA2 and a cyclic redundancy check data CRC. A packet PKT3 may be provided to the host 103 through the CXL switch 110, the packet PKT3 may include a header H, the internal data IDTA3 and a cyclic redundancy check data CRC.

Figure 7:
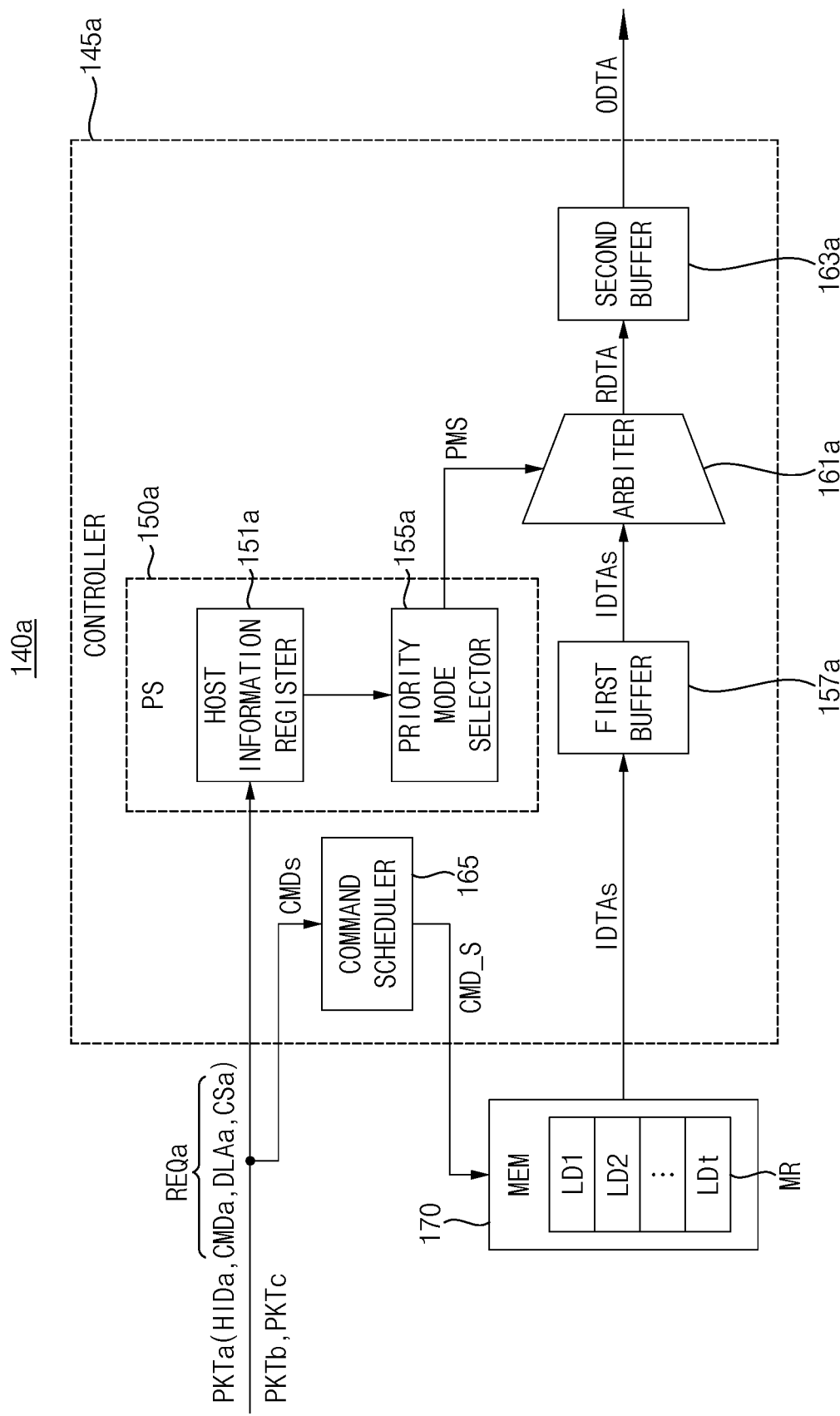
FIG. 7 is block diagram illustrating another example of a CXL device in the computing system of FIG. 2 according to example embodiments.

FIG. 7 is block diagram illustrating another example of a CXL device in the computing system of FIG. 2 according to example embodiments.

In FIG. 7, a configuration of the CXL device 140a is illustrated as an example of a CXL device 140 of the plurality of CXL devices 140, 180 and 185 each configuration of the CXL devices 180 and 185 may be substantially the same as the configuration of the CXL device 140a.

Referring to FIG. 7, a CXL device 140a may include a controller 145a and a memory 170.

The controller 145a may receive packets PKTa, PKTb and PKTc from all or a portion of the plurality of hosts 101, 102 and 103 in FIG. 2.

The packet PKTa may include a host identifier HIDa and the request REQa and the request REQa may include a command CMDa, a device logical address DLAa and a chip selection signal CSa. A host issuing the packet PKTa may be identified by the host identifier HIDa.

The packet PKTb may include a corresponding host identifier and a corresponding request, and the packet PKTc may include a corresponding host identifier and a corresponding request.

The memory 170 may include a memory region MR that is divided into a plurality of logical devices LD1, LD2, ..., LDt.

The controller 145a may include a priority scheduler 150a, a first buffer 157a, an arbiter 161a, a second buffer 163a and a command scheduler 165, and the priority scheduler (PS) 150a may include a host information register 151a and a priority mode selector 155a. As is traditional in the field of the disclosed technology, features and embodiments are described, and illustrated in the drawings, in terms of functional blocks, units, and/or modules. Those skilled in the art will appreciate that these blocks, units, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or similar, they may be programmed using software (e.g., microcode) to perform various functions discussed herein and may optionally be driven by firmware and/or software. Alternatively, each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of the embodiments may be physically separated into two or more interacting and discrete blocks, units, and/or modules without departing from the scope of the inventive concepts. Further, the blocks, units, and/or modules of the embodiments may be physically combined into more complex blocks, units, and/or modules (e.g., as shown in FIG. 7 for the host information register 151a and priority mode selector 155a) without departing from the scope of the inventive concepts.

The command scheduler 165 may provide scheduled commands CMD_S to the memory 170 by scheduling commands CMDs included in the packets PKTa, PKTb and PKTc and the memory 170 memory generate internal data IDTAs by performing memory operations corresponding to the scheduled commands CMD_S and may provide the internal data IDTAs to the first buffer 157a.

The host information register 151a may receive the packets PKTa, PKTb and PKTc may store attribute information of each of all or some of the plurality of hosts 101, 102 and 103 based on the packets PKTa, PKTb and PKTc.

The priority mode selector 155a may designate a first host from the plurality of hosts 101, 102 and 103 as the priority host based on the attribute information of each of all or some of the plurality of hosts 101, 102 and 103, which is stored in the host information register 151a, may generate a priority mode signal PMS indicating that the first host is designated as the priority host and may provide the priority mode signal PMS to the arbiter 161a.

The arbiter 161a may receive the internal data IDTAs from the first buffer 157a, may generate rearranged data RDTA by rearranging the internal data IDTAs in response to the priority mode signal PMS and may provide the rearranged data RDTA to the second buffer 163a.

The second buffer 163a may receive the rearranged data RDTA and may provide the all or some of the plurality of hosts 101, 102 and 103 with the rearranged data RDTA by a receiving order as an output data ODTA.

The priority scheduler 150a or the controller 145a may designate a first host from the plurality of hosts 101, 102 and 103 as the priority host based on the attribute information of each the plurality of hosts 101, 102 and 103 and may generate the output data ODTA by rearranging the internal data IDTAs such that a data requested by the first host is output with priority.

Figure 8:
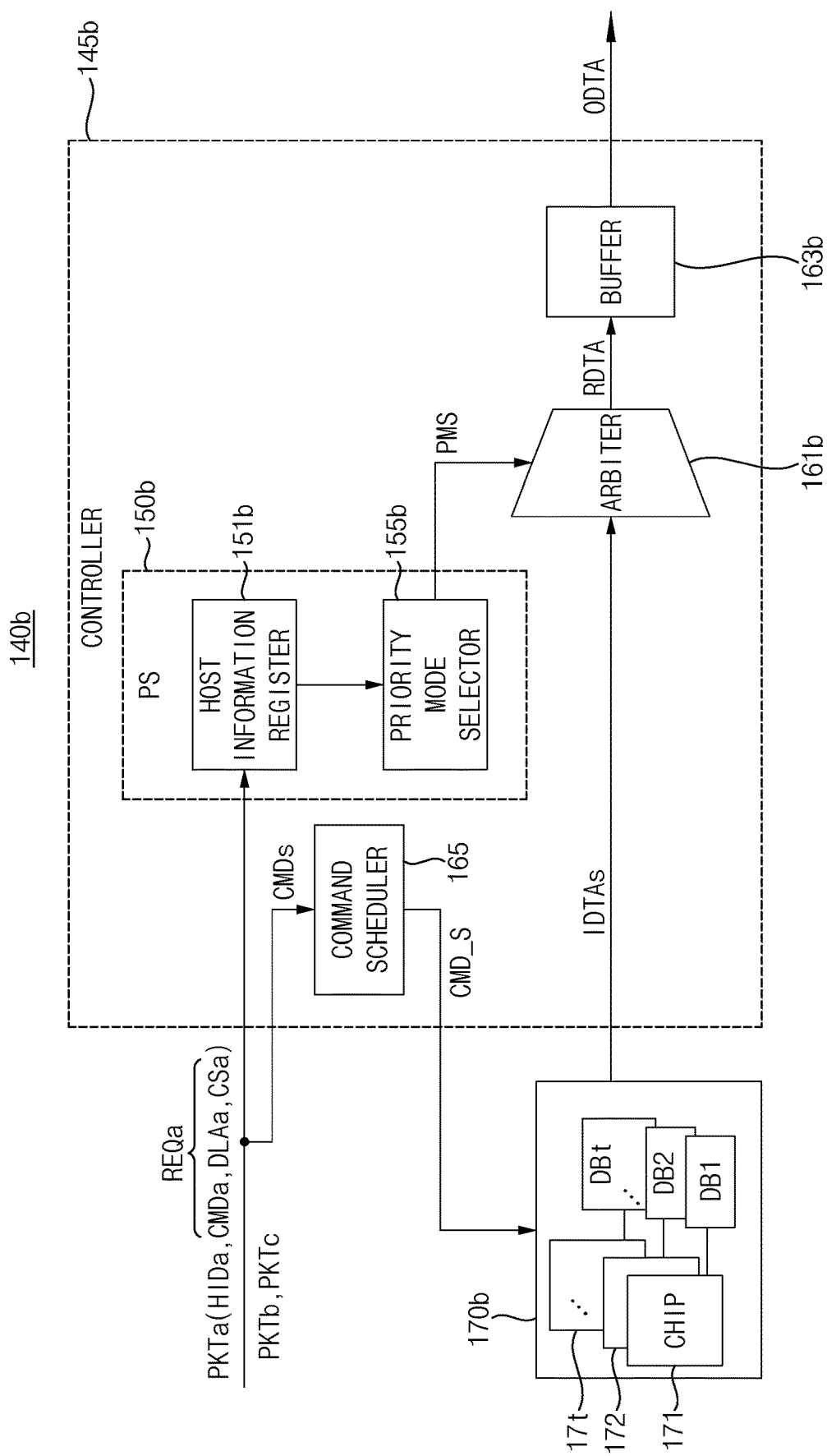
FIG. 8 is block diagram illustrating another example of a CXL device in the computing system of FIG. 2 according to example embodiments.

FIG. 8 is block diagram illustrating another example of a CXL device in the computing system of FIG. 2 according to example embodiments.

In FIG. 8, a configuration of the CXL device 140b is illustrated as an example of a CXL device 140 of the plurality of CXL devices 140, 180 and 185 each configuration of the CXL devices 180 and 185 may be substantially the same as the configuration of the CXL device 140b.

Referring to FIG. 8, a CXL device 140b may include a controller 145b and a memory module 170b.

The controller 145b may receive packets PKTa, PKTb and PKTc from all or a portion of the plurality of hosts 101, 102 and 103 in FIG. 2.

The packet PKTa may include a host identifier HIDa and the request REQa and the request REQa may include a command CMDa, a device logical address DLAa and a chip selection signal CSa. A host issuing the packet PKTa may be identified by the host identifier HIDa.

The packet PKTb may include a corresponding host identifier and a corresponding request, and the packet PKTc may include a corresponding host identifier and a corresponding request.

The memory module 170b may include a plurality of (memory) chips 171, 172, . . . , 17t and a plurality of data buffers DB1, DB2, . . . , DBt. The plurality of data buffers DB1, DB2, . . . , DBt may be connected to the plurality of chips 171, 172, . . . , 17t and may store temporarily internal data output from the plurality of chips 171, 172, . . . , 17t, respectively.

The controller 145b may include a priority scheduler 150b, an arbiter 161b a buffer 163b and a command scheduler 165, and the priority scheduler 150b may include a host information register 151b and a priority mode selector 155b.

The command scheduler 165 may provide scheduled commands CMD_S to the memory module 170b by scheduling commands CMDs included in the packets PKTa, PKTb and PKTc and the memory chips 171, 172, . . . , 17t in the memory module 170b to generate internal data IDTAs by performing memory operations corresponding to the scheduled commands CMD_S, and the memory chips 171, 172, 17t may provide the internal data IDTAs to the plurality of data buffers DB1, DB2, . . . , DBt.

The host information register 151b may receive the packets PKTa, PKTb and PKTc may store attribute information of each of all or some of the plurality of hosts 101, 102 and 103 based on the packets PKTa, PKTb and PKTc.

The priority mode selector 155b may designate a first host from the plurality of hosts 101, 102 and 103 as the priority mode based on the attribute information of each of all or some of the plurality of hosts 101, 102 and 103, which is stored in the host information register 151b, and may generate a priority mode signal PMS indicating that the first host is designated as the priority host and may provide the priority mode signal PMS to the arbiter 161b.

The arbiter 161b may receive the internal data IDTAs from the plurality of data buffers DB1, DB2, . . . , DBt, may generate rearranged data RDTA by rearranging the internal data IDTAs in response to the priority mode signal PMS and may provide the rearranged data RDTA to the buffer 163b.

The buffer 163b may receive the rearranged data RDTA and may provide all or some of the plurality of hosts 101, 102 and 103 with the rearranged data RDTA according to a receiving order as output data ODTA.

The priority scheduler 150b or the controller 145b may designate a first host from the plurality of hosts 101, 102 and 103 as the priority host based on the attribute information of each the plurality of hosts 101, 102 and 103 and may generate the output data ODTA by rearranging the internal data IDTAs such that a data requested by the first host is output with priority.

Figure 9:
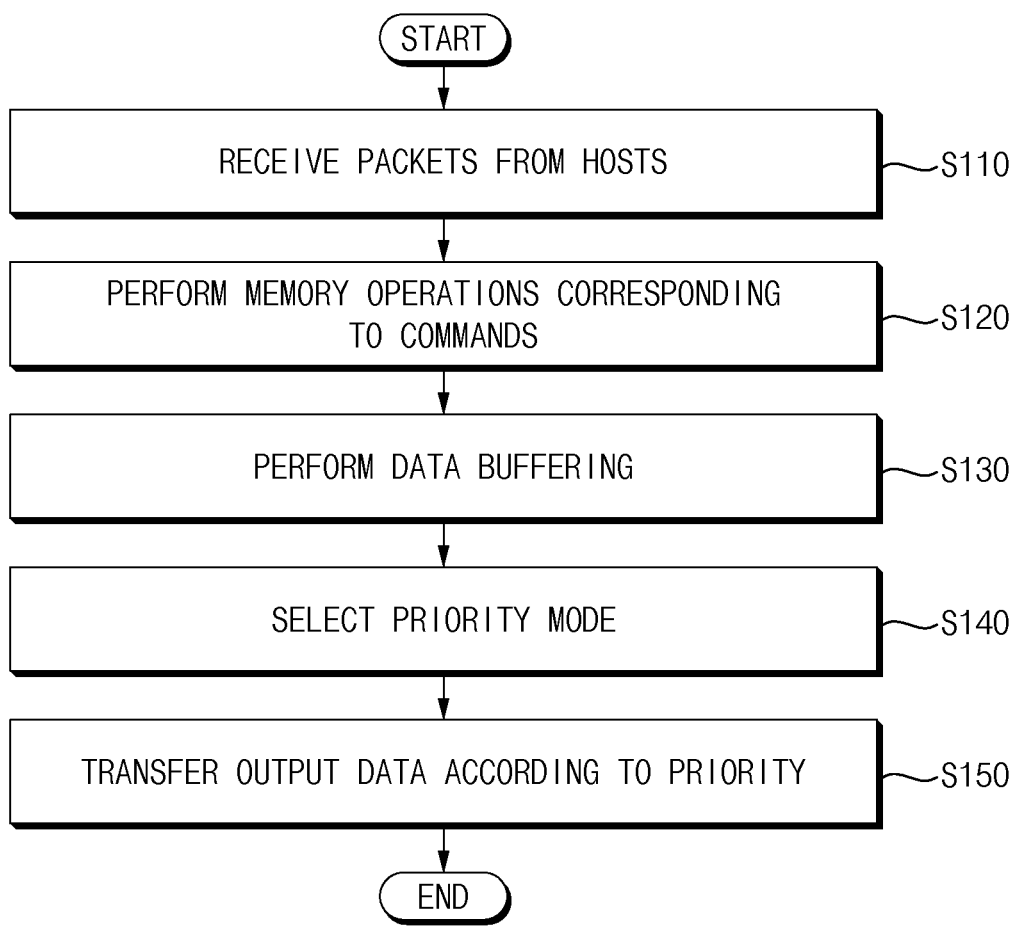
FIG. 9 is a flowchart illustrating a method of operating a CXL device according to example embodiments.

FIG. 9 is a flowchart illustrating a method of operating a CXL device according to example embodiments.

Referring to FIGS. 2 through 9, in a method of a memory device such as CXL device 140 (e.g., a CXL-compatible memory) which is connected to a plurality of hosts 101, 102 and 103 through a CXL switch 110 and communicates with the plurality of hosts 101, 102 and 103 through a CXL protocol, the CXL device 140 receives packets PKTa, PKTb and PKTc from the plurality of hosts 101, 102 and 103 (operation S110).

A memory 170 in the CXL device 140 generates internal data IDTAs by performing memory operations corresponding to commands included in the packets PKTa, PKTb and PKTc (operation S120).

A first buffer 157 included in a controller priority scheduler 150 in the CXL device 140 performs data buffering to store the internal data IDTAs temporarily (operation S130).

A priority mode selector 155 in a priority scheduler 150 in the CXL device 140 designates the host 101 as a priority host based on attribute information of each of the plurality of hosts 101, 102 and 103, which is stored in a host information register 151 (operation S140) and provide a priority mode signal PMS indicating that the host 101 is designated as the priority host to the arbiter 161.

The arbiter 161 generates rearranged data RDTA by rearranging the internal data IDTAs stored in the first buffer 157 in response to the priority mode signal PMS and rearranged data RDTA to a buffer 163 and the second buffer 163 transfers the rearranged data RDTA as an output data ODTA to the plurality of hosts 101, 102 and 103 through the CXL switch 110 (operation S150).

The method of FIG. 2 may be applied to the computing system 10 as described with reference to FIG. 1 including the plurality of host devices 11, 12, and 13 and the plurality of memory devices 15, 16 and 17 that communicate through the interconnect device 18, and may be applied to the different embodiments of memory devices described in any of FIG. 3, 7, or 8.

Figure 10:
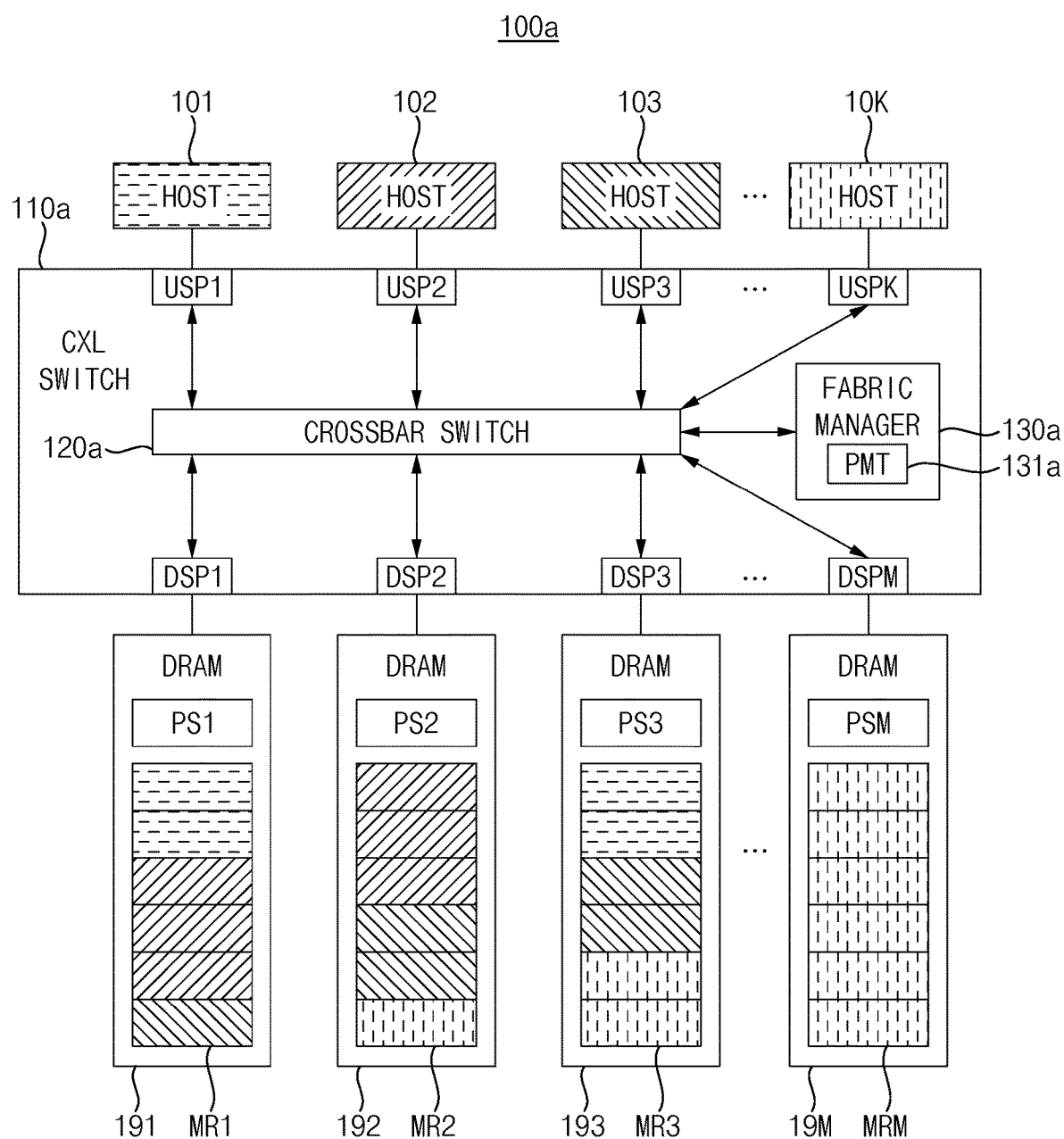
FIG. 10 is block diagram illustrating a computing system according to example embodiments.

FIG. 10 is block diagram illustrating a computing system according to example embodiments.

Referring to FIG. 10, a computing system 100a may include a plurality of hosts 101, 102, 103, . . . , 10K, a plurality of dynamic random access memories (DRAM)s 191, 192, 193, . . . , 19M and a CXL switch 110a. Here, K may be an integer greater than three and M may be an integer greater than three.

The plurality of hosts 101, 102, 103, . . . , 10K and the plurality of DRAMs 191, 192, 193, . . . , 19M may communicate with each other based on CXL protocol through the CXL switch 110a.

The CXL switch 110a may include upstream ports USP1, USP2, USP3, . . . , USPK coupled to the plurality of hosts 101, 102, 103, . . . , 10K, respectively, downstream ports DSP1, DSP2, DSP3, . . . , DSPM coupled to the plurality of DRAMs 191, 192, 193, . . . , 19M, respectively, a crossbar switch 120a and a fabric manager 130a.

The crossbar switch 120a may connect at least one of the upstream ports USP1, USP2, USP3, . . . , USPK to at least one of the downstream ports DSP1, DSP2, DSP3, . . . , DSPM and the fabric manager 130a may manage a port map table PMT 131a including port connection information on connections between the upstream ports USP1, USP2, USP3, . . . , USPK and the downstream ports DSP1, DSP2, DSP3, . . . , DSPM. Therefore, at least a portion of (e.g., some of) the plurality of DRAMs 191, 192, 193, . . . , 19M may be shared by the plurality of hosts 101, 102, 103, . . . , 10K through the crossbar switch 120a, and the fabric manager 130a may manage connection relationships between the plurality of hosts 101, 102, 103, . . . , 10K and the plurality of DRAMs 191, 192, 193, . . . , 19M.

Each of the plurality of DRAMs 191, 192, 193, . . . , 19M may include a respective one of a plurality of priority schedulers PS1, PS2, PS3, . . . , PSM and a respective one of a plurality of memory regions MR1, MR2, MR3, . . . , MRM. Each of the memory regions MR1, MR2, MR3, . . . , MRM may include logical devices shared by at least a portion of (e.g., some of) the plurality of hosts 101, 102, 103, . . . , 10K. For example, in one embodiment, the memory region MR1 may be shared by the hosts 101, 102 and 103, the memory region MR2 may be shared by the hosts 102, 103 and 10K, the memory region MR3 may be shared by the hosts 101, 103 and 10K and the memory region MRM may be dedicated to the host 10K. The different types of shading in FIG. 10 show which hosts are shared with which memory regions.

The respective one of the plurality of DRAMs 191, 192, 193, . . . , 19M may generate internal data by performing memory operations corresponding to commands included in requests from the plurality of hosts 101, 102, 103, . . . , 10K and the respective one of the priority schedulers PS1, PS2, PS3, . . . , PSM may designate at least one host (i.e., a first host) from the plurality of hosts 101, 102, 103, . . . , 10K as a priority host based on attribute information of each of the plurality of hosts 101, 102, 103, . . . , 10K, and may generate an output data by rearranging the internal data such that a data requested by the at least one host in the priority mode (i.e., the first host) is output with priority.

Figure 11:
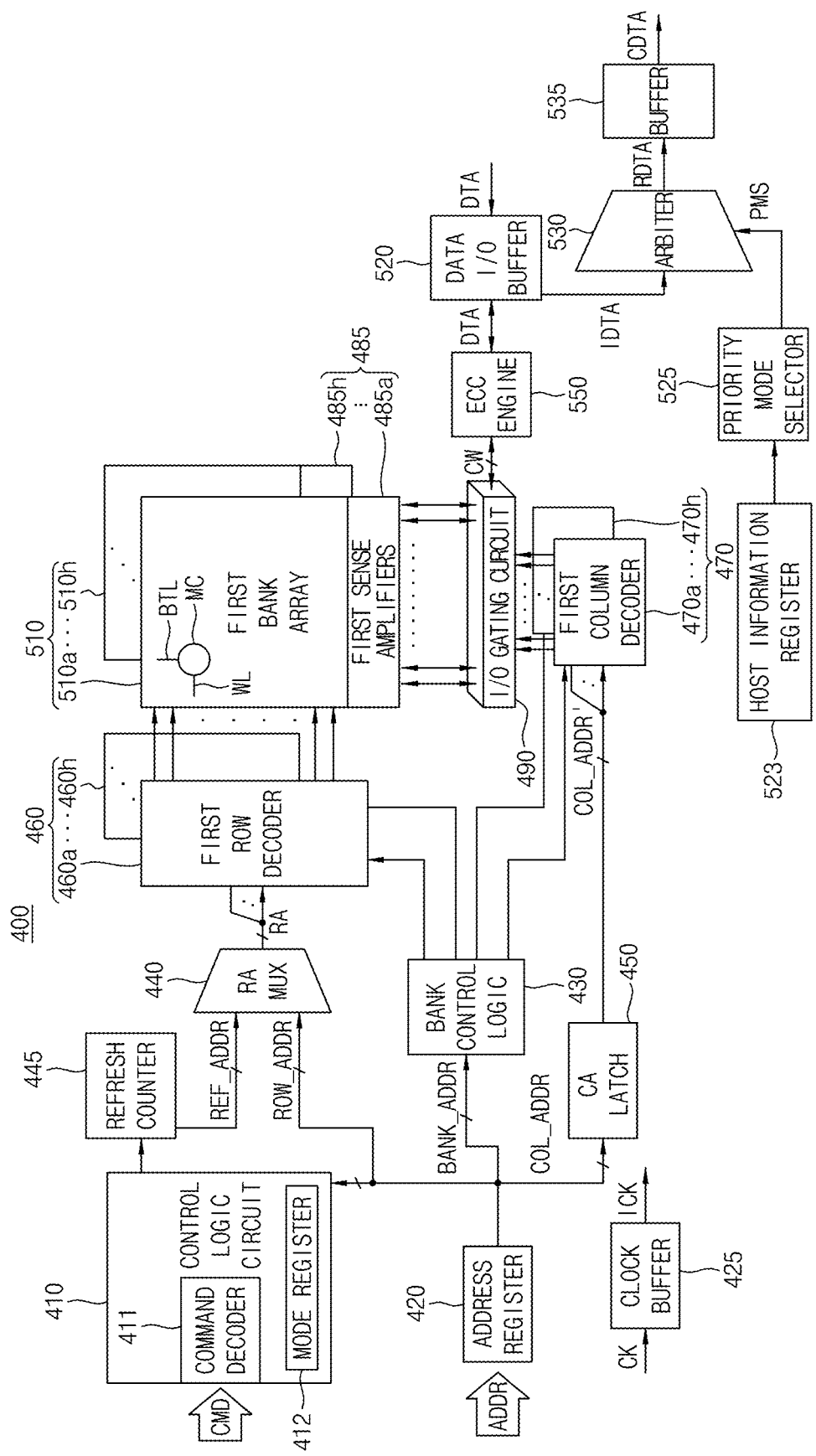
FIG. 11 is a block diagram illustrating an example one of the DRAMs in the computing system of FIG. 10 according to example embodiments.

FIG. 11 is a block diagram illustrating an example one of the DRAMs in the computing system of FIG. 10 according to example embodiments.

Each of the DRAMs 191, 192, 193, . . . , 19M may be referred to as a semiconductor memory device and may be, for example, in the form of a semiconductor chip or semiconductor package including one or more semiconductor chips.

Referring to FIG. 11, a semiconductor memory device 400 may include a control logic circuit 410, an address register 420, a clock buffer 425, a bank control logic 430, a refresh counter 445, a row address multiplexer 440, a column address latch 450, a row decoder 460, a column decoder 470, a memory cell array 510, a sense amplifier unit 485, an I/O gating circuit 490, an error correction code (ECC) engine 550, and a data I/O buffer 520, a host information register 523, a priority mode selector 525, an arbiter 530 and a buffer 535.

The memory cell array 510 includes first through eighth bank arrays 510a~510h. The row decoder 460 includes first through eighth row decoders 460a~460h respectively coupled to the first through eighth bank arrays 510a~510h, the column decoder 470 includes first through eighth column decoders 470a~470h respectively coupled to the first through eighth bank arrays 510a~510h, and the sense amplifier unit 485 includes first through eighth sense amplifiers 485a~485h respectively coupled to the first through eighth bank arrays 510a~510h.

The first through eighth bank arrays 510a~510h, the first through eighth row decoders 460a~460h, the first through eighth column decoders 470a~470h and first through eighth sense amplifiers 485a~485h may form first through eighth banks. Each of the first through eighth bank arrays 510a~510h may include a plurality of memory cells MC formed at intersections of a plurality of word-lines WL and a plurality of bit-line BTL.

The address register 420 may receive the address ADDR including a bank address BANK_ADDR, a row address ROW_ADDR and a column address COL_ADDR from at least a portion of the plurality of hosts 101, 102, 103, . . . , 10K. The address register 420 may provide the received bank address BANK_ADDR to the bank control logic 430, may provide the received row address ROW_ADDR to the row address multiplexer 440, and may provide the received column address COL_ADDR to the column address latch 450.

The bank control logic 430 may generate bank control signals in response to the bank address BANK_ADDR. One of the first through eighth row decoders 460a~460h corresponding to the bank address BANK_ADDR is activated in response to the bank control signals, and one of the first through eighth column decoders 470a~470h corresponding to the bank address BANK_ADDR is activated in response to the bank control signals.

The row address multiplexer 440 may receive the row address ROW_ADDR from the address register 420, and may receive a refresh row address REF_ADDR from the refresh counter 445. The row address multiplexer 440 may selectively output the row address ROW_ADDR or the refresh row address REF_ADDR as a row address RA. The row address RA that is output from the row address multiplexer 440 is applied to the first through eighth row decoders 460a~460h.

The refresh counter 445 may sequentially increase or decrease the refresh row address REF_ADDR and may output the refresh row address REF_ADDR under control of the control logic circuit 410.

The activated one of the first through eighth row decoders 460a~460h, by the bank control logic 430, may decode the row address RA that is output from the row address multiplexer 440, and may activate a word-line corresponding to the row address RA. For example, the activated bank row decoder applies a word-line driving voltage to the word-line corresponding to the row address.

The column address latch 450 may receive the column address COL_ADDR from the address register 420, and may temporarily store the received column address COL_ADDR. In some embodiments, in a burst mode, the column address latch 450 generates column addresses COL_ADDR' that increment from the received column address COL_ADDR. The column address latch 450 may apply the temporarily stored column address COL_ADDR or generated column address COL_ADDR' to the first through eighth column decoders 470a~470h.

The activated one of the first through eighth column decoders 470a~470h may activate a sense amplifier corresponding to the bank address BANK_ADDR and the column address COL_ADDR through the I/O gating circuit 490.

The I/O gating circuit 490 may include a circuitry for gating input/output data, and further includes input data mask logic, read data latches for storing data that is output from the first through eighth bank arrays 510a~510h, and write drivers for writing data to the first through eighth bank arrays 510a~510h.

Codeword CW read from one bank array of the first through eighth bank arrays 510a~510h may be sensed by a sense amplifier coupled to the one bank array from which the codeword CW is to be read, and may be stored in the read data latches. The codeword CW stored in the read data latches may be provided to the ECC engine 550, the ECC engine 550 may generate data DTA by performing an ECC decoding on the codeword CW to provide the data DTA to the data I/O buffer 520, and the data I/O buffer 520 may provide the data DTA to the arbiter 530 as an internal data IDTA.

The data DTA to be written in a selected one bank array of the first through eighth bank arrays 510a~510h may be provided to the data I/O buffer 520 from the at least a portion of the plurality of hosts 101, 102, 103, . . . , 10K to the ECC engine 550. The data I/O buffer 520 may provide the data DTA to the ECC engine 550. The ECC engine 550 may perform ECC encoding on the data DTA to generate parity bits, and the ECC engine 550 may provide the codeword CW including the data DTA and the parity bits to the I/O gating circuit 490. The I/O gating circuit 490 may write the codeword CW in a target page in the selected one bank array through the write drivers.

The ECC engine 550 may perform an ECC encoding on the data DTA and an ECC decoding on the codeword CW under control of the control of the control logic circuit 410.

The clock buffer 425 may receive the clock signal CK, may generate an internal clock signal ICK by buffering the clock signal CK, and may provide the internal clock signal ICK to circuit components processing the command CMD and the address ADDR.

The control logic circuit 410 may control operations of the semiconductor memory device 400. For example, the control logic circuit 410 may generate control signals for the semiconductor memory device 401a in order to perform a write operation or a read operation. The control logic circuit 410 may include a command decoder 411 that decodes the command CMD received from the smart controller 210 and a mode register 412 that sets an operation mode of the semiconductor memory device 400.

For example, the command decoder 411 may generate the control signals corresponding to the command CMD by decoding a write enable signal, a row address strobe signal, a column address strobe signal, a chip select signal, etc.

The host information register 523 may store attribute information of at least some of the plurality of hosts 101, 102, 103, . . . , 10K. The priority mode selector 525 may designate at least one host (i.e., a first host) from the plurality of hosts 101, 102, 103, . . . , 10K as a priority host based on attribute information stored in the host information register 523, may generate a priority mode signal PMS indicating that the first host is designated as the priority host and may provide the priority mode signal PMS to the arbiter 530.

The arbiter 530 may receive the data DTA stored in the data I/O buffer 520 as the internal data IDTA, may generate rearranged data RDTA by rearranging the internal data IDTA in response to the priority mode signal PMS such that data requested by the host designated as the priority mode is output with priority and may provide the rearranged data RDTA to the buffer 535. The buffer 535 may receive the rearranged data RDTA and may provide the all or some of the plurality of hosts 101, 102, 103, . . . , 10K with the rearranged data RDTA by a rearranged order as an output data ODTA.

Figure 12:
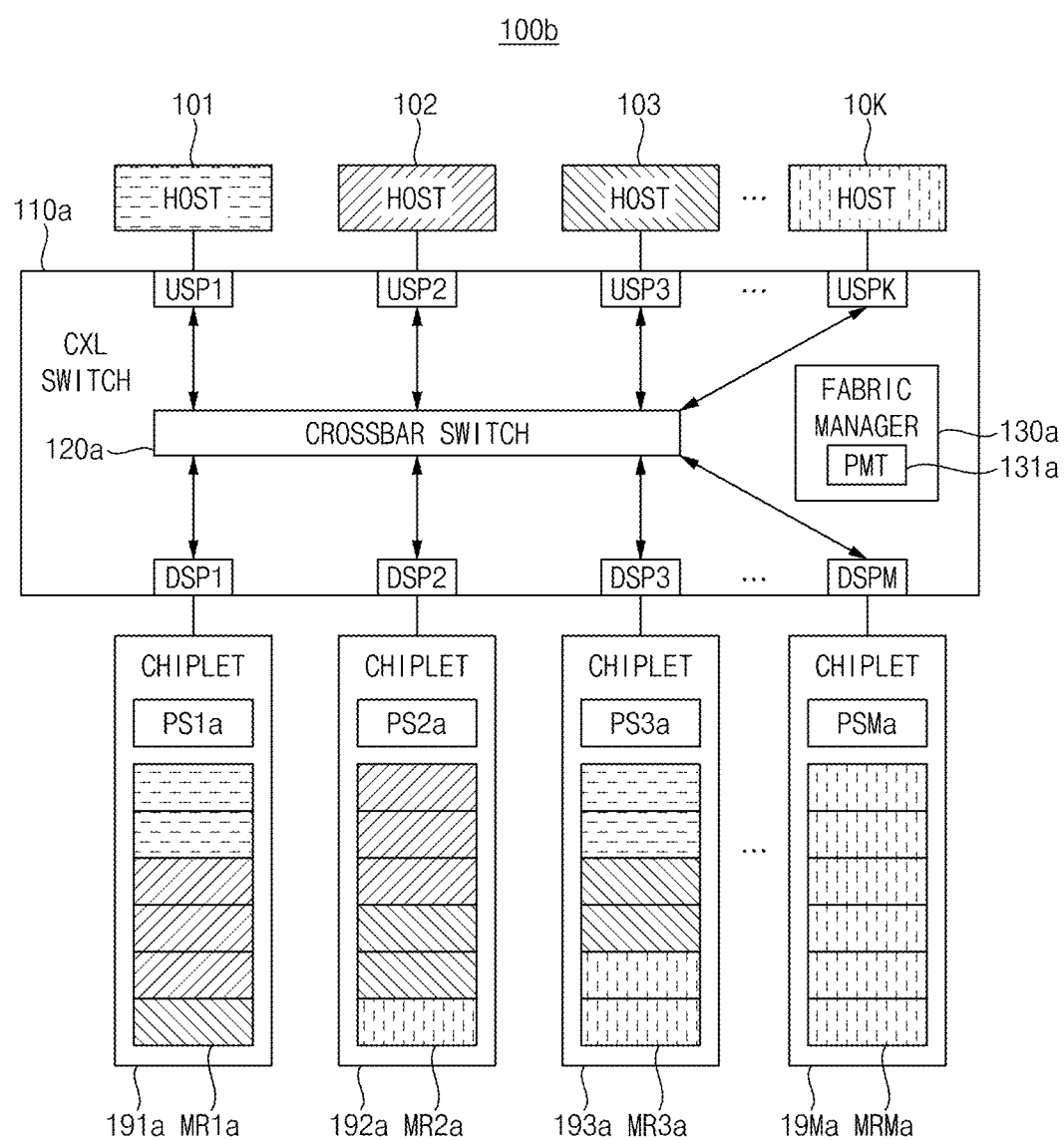
FIG. 12 is block diagram illustrating a computing system according to example embodiments.

FIG. 12 is block diagram illustrating a computing system according to example embodiments.

Referring to FIG. 12, a computing system 100b may include a plurality of hosts 101, 102, 103, . . . , 10K, a plurality of chiplets 191a, 192a, 193a, . . . , 19Ma and a CXL switch 110a.

The plurality of hosts 101, 102, 103, . . . , 10K and the plurality of chiplets 191a, 192a, 193a, . . . , 19Ma may communicate with each other based on CXL protocol through the CXL switch 110a.

The computing system 100b differs from the computing system 100a in that plurality of chiplets 191a, 192a, 193a, . . . , 19Ma instead of the plurality of DRAMs 191, 192, 193, . . . , 19M are connected to the CXL switch 110a. Descriptions of similar components as FIG. 10 will be omitted.

Each of the plurality of chiplets 191a, 192a, 193a, . . . , 19Ma may include a respective one of a plurality of priority schedulers PS1a, PS2a, PS3a, . . . , PSMa and a respective one of a plurality of memory regions MR1a, MR2a, MR3a, MRMa. Each of the memory regions MR1a, MR2a, MR3a, . . . , MRMa may include logical devices shared by at least a portion of (e.g., some of) the plurality of hosts 101, 102, 103, . . . , 10K. The memory region MR1a may be shared by the hosts 101, 102 and 103, the memory region MRa2 may be shared by the hosts 102, 103 and 10M, the memory region MR3a may be shared by the hosts 101, 103 and 10M and the memory region MRMa may be dedicated to the host 10M.

The respective one of the plurality of chiplets 191a, 192a, 193a, . . . , 19Ma may generate internal data by performing memory operations corresponding to commands included in requests from the plurality of hosts 101, 102, 103, . . . , 10K and the respective one of the priority schedulers PS1a, PS2a, PS3a, . . . , PSMa may designate at least one host (i.e., a first host) from the plurality of hosts 101, 102, 103, . . . , 10K as a priority mode based on attribute information of each of the plurality of hosts 101, 102, 103, . . . , 10K, and may generate an output data by rearranging the internal data such that a data requested by the at least one host in the priority mode (i.e., the first host) is output with priority.

Figure 13:
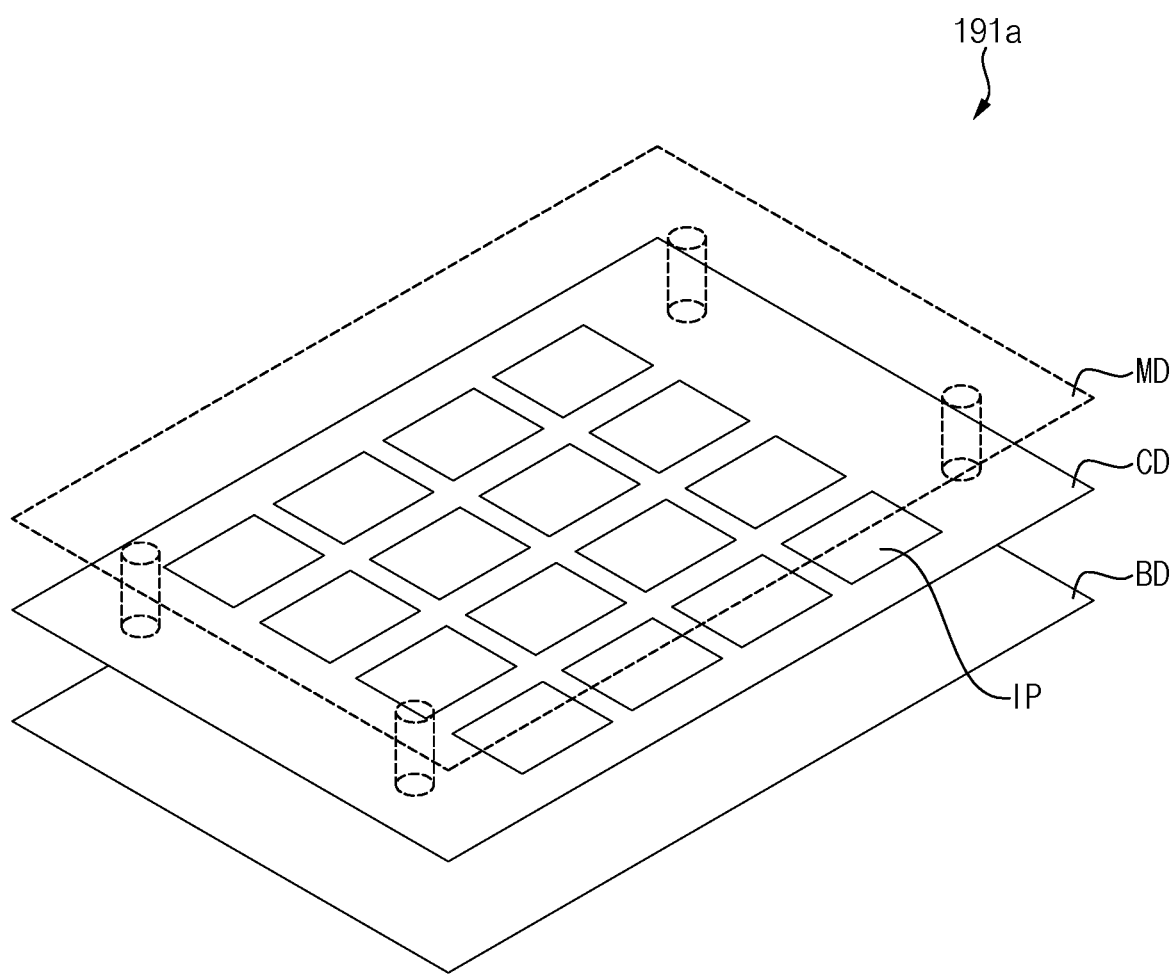
FIG. 13 is a block diagram illustrating one of the plurality of chiplets in the computing system of FIG. 12 according to example embodiments.

FIG. 13 is a block diagram illustrating one of the plurality of chiplets in the computing system of FIG. 12 according to example embodiments.

In FIG. 13, a configuration of the chiplet 191a of the plurality of chiplets 191a, 192a, 193a, . . . , 19Ma is illustrated for example and each configuration of the plurality of chiplets 192a, 193a, . . . , 19Ma may be substantially the same as the configuration of the chiplet 191a.

Referring to FIG. 13, the chiplet 191a may have the 3D chiplet structure including a base die BD, and a compute die CD stacked on the base die BD. A plurality of function blocks IP may be arranged on at least one of the base die BD and the compute die CD. In FIG. 13, the plurality of function blocks IP are illustrated as arranged on the compute die CD, but the example embodiments are not limited thereto, and the plurality of function blocks IP may also be arranged on the base die BD.

In this case, each of the plurality of function blocks IP may include a chip designed to perform a designated particular function. For example, each of the plurality of function blocks IP may include a CPU chip, an input/output interface chip, a chip in which circuits for an artificial intelligence (AI) operation are implemented, a graphics chip, a media chip, etc. Some of the plurality of function blocks IP may include chips performing the same function.

In the chiplet 191a, it may be possible to variously modify types of the plurality of function blocks IP, which are arranged on the base die BD and the compute die CD according to the purpose of the chiplet 191a. Accordingly, the chiplet 191a may have improved reusability and expandability, compared to a system-on chip (SoC) of a comparative example, in which the SoC is implemented as one function block.

A memory die MD may be arranged on the compute die CD of the chiplet 191a. The memory die MD may be electrically connected to the compute die CD via a plurality of interconnection vias, and the interconnection vias may constitute signal paths.

Figure 14:
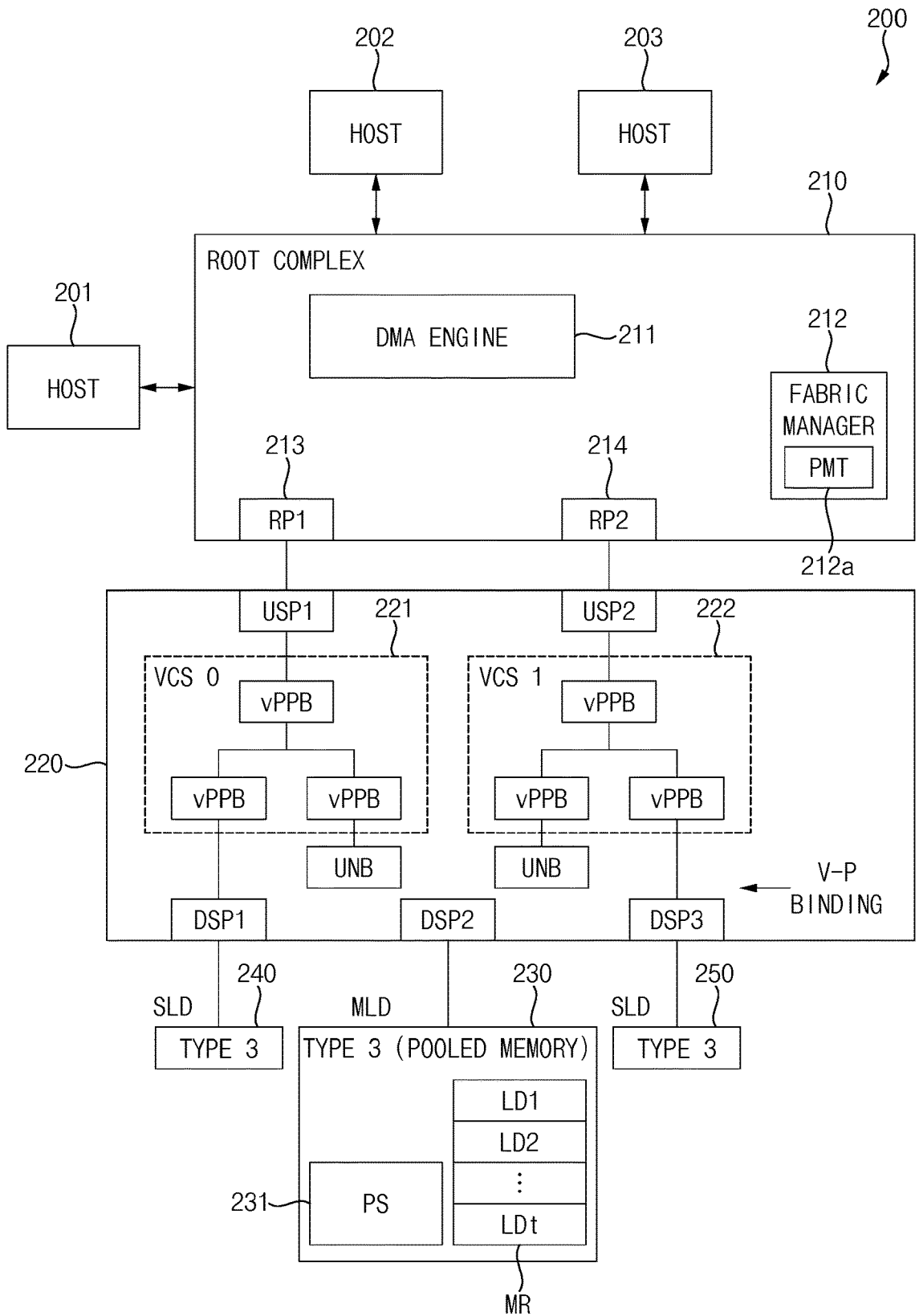
FIGS. 14 and 15 are block diagrams illustrating a computing system adopting a CXL protocol according to example embodiments.
Figure 15:
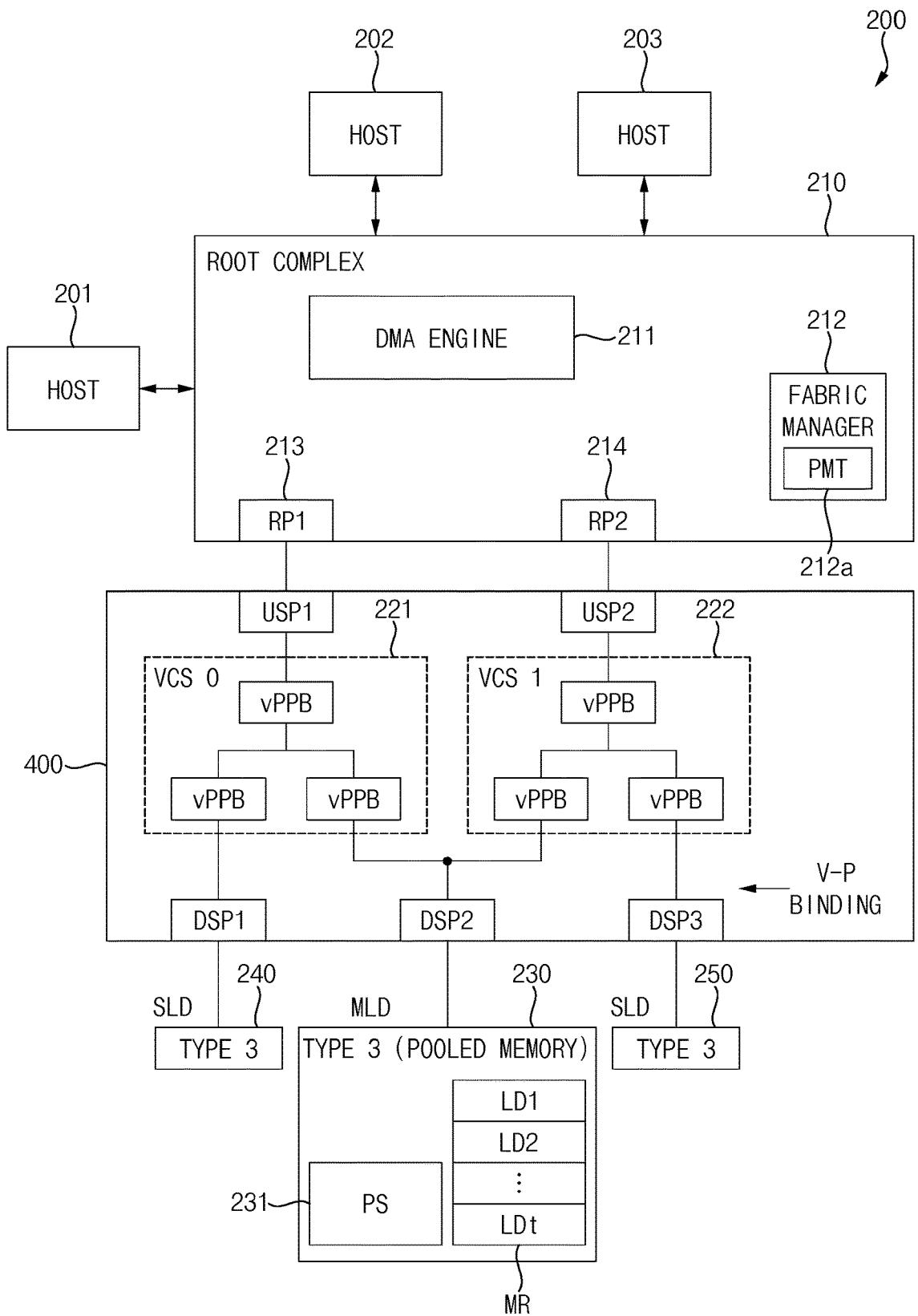

FIGS. 14 and 15 are block diagrams illustrating a computing system adopting a CXL protocol according to example embodiments. A plurality of hosts 201, 202 and 203 shown in FIGS. 14 and 15 may include various types of devices such as CPU, GPU, NPU, FPGA, and peripheral devices.

A computing system 200 may include a root complex 210 and hosts 201, 202 and 203, and the root complex 210 may include a DMA (direct memory access) engine 211 and one or more root ports, for example, first and second root ports RP1 213 and RP2 214 connected to a memory device. According to example embodiments, the root complex 210 may further include a fabric manager 212 that transfers data or requests through a fabric such as Ethernet, and may be connected to endpoints through the fabric. FIGS. 14 and 15 show examples in which the fabric manager 212 is included in the root complex 210, but it is not limited thereto.

According to example embodiments, the fabric manager 212 may be included in CXL switch 220. In an example embodiment, the fabric manager 212 may be implemented in the form of firmware. As an example, the endpoint may include flash-based memory such as SSD and UFS, volatile memory such as DRAM and SDRAM (Synchronous DRAM), and nonvolatile memory such as PRAM, MRAM, RRAM, and FRAM. In FIGS. 14 and 15, the root complex 210 is shown as a component separate from the host device, but the root complex 210 may be implemented in an integrated form in each of the hosts 201, 202 and 203.

The root complex 210 may provide data communication based on various types of protocols between the hosts 201, 202 and 203 and a plurality of memory devices 230, 240 and 250. In some example embodiments, the root complex 210 and the plurality of memory devices 230, 240 and 250 may perform an interface including various protocols defined in CXL, for example, an I/O protocol (CXL.io).

Meanwhile, each of the plurality of memory devices 230, 240 and 250 may correspond to a Type 3 device defined in the CXL protocol, and accordingly, each of the plurality of memory devices 230, 240 and 250 may include a memory expander and the memory expander may include a controller. In some example embodiments, a memory device including a plurality of memory regions and a memory expander may be implemented as separate devices.

FIGS. 14 and 15 show one CXL switch 220 according to the CXL standard.

According to example embodiments, the computing system 200 may support multiple virtual channels. A virtual channel may provide multiple transport paths that are logically separated within one physical interface. In the example embodiments of FIGS. 14 and 15, a first virtual channel 221 corresponding to the first root port 213 and a second virtual channel 222 corresponding to the second root port 214 are exemplified, but the virtual channels of the computing system 200 may be implemented in various other forms. In addition, components of the hosts 201, 202 and 203, the root complex 210, and virtual channels may be considered as constituting a host system.

A single root port may be connected to multiple different devices through a virtual channel, or two or more root ports may be connected to a single device. For example, the first root port 213 may be connected to the memory device 240 through a path including one or more virtual PCI-to-PCI bridges (vPPBs), and also the first root port 213 may be connected to the memory device 230 through another path including one or more vPPBs. Similarly, the second root port 214 may be connected to the memory device 230 through one path including one or more vPPBs and connected to the third memory device 250 through another path including one or more vPPBs.

The computing system 200 may provide a multi-logical device (MLD) supported by the CXL protocol. In an example embodiment, in the structure of the computing system 200 shown in FIGS. 14 and 15, the memory device 230 communicates with two or more host devices through the first and second root ports 213 and 214. The memory device 230 may include first to t-th logical devices LD1, LD2, . . . , LDt allocated to different host devices. As an example, the logical device LD1 may be allocated to the host 201 and may communicate with the host 201 through the first root port 213. Also, the logical device LD2 may be allocated to the host 202 and may communicate with the host 202 through the second root port 214. Meanwhile, each of the memory devices 240 and 250 may communicate through any one root port and may correspond to a single-logical device (SLD).

The memory device 230 may include a priority scheduler 231 and the priority scheduler 231 may designate a first host from the plurality of hosts 201, 202 and 203 as the priority host based on attribute information of each the plurality of hosts 201, 202 and 203, may generate the output data by rearranging the internal data such that a data requested by the first host is output with priority and may provide the output data to all or some of the plurality of hosts 201, 202 and 203.

The fabric manager 212 may manage a port map table 212a including port connection information between upstream ports USP1 and USP2 and downstream ports DSP1, DSP2 and DSP3 included in each CXL switch 220. FIG. 14 shows a state in which some vPPBs are not connected to a physical port (UNB), and FIG. 15 shows a state in which the corresponding vPPBs are connected to a physical port, for example, the downstream port DSP2. Through virtual-physical connection (V-P BINDING) between the vPPBs and the downstream ports DSP1, DSP2 and DSP3, mapping between the upstream ports USP1 and USP2 and the downstream ports DSP1, DSP2 and DSP3 may be implemented, and as a result, the connection between devices connected to the physical port may be controlled. This virtual-physical connection (V-P BINDING) may be controlled by the fabric manager 212. The fabric manager 212 may manage the port map table 212a including the port connection information between the upstream ports USP1 and USP2 and the downstream ports DSP1, DSP2 and DSP3 included in the CXL switch 220.

Figure 16:
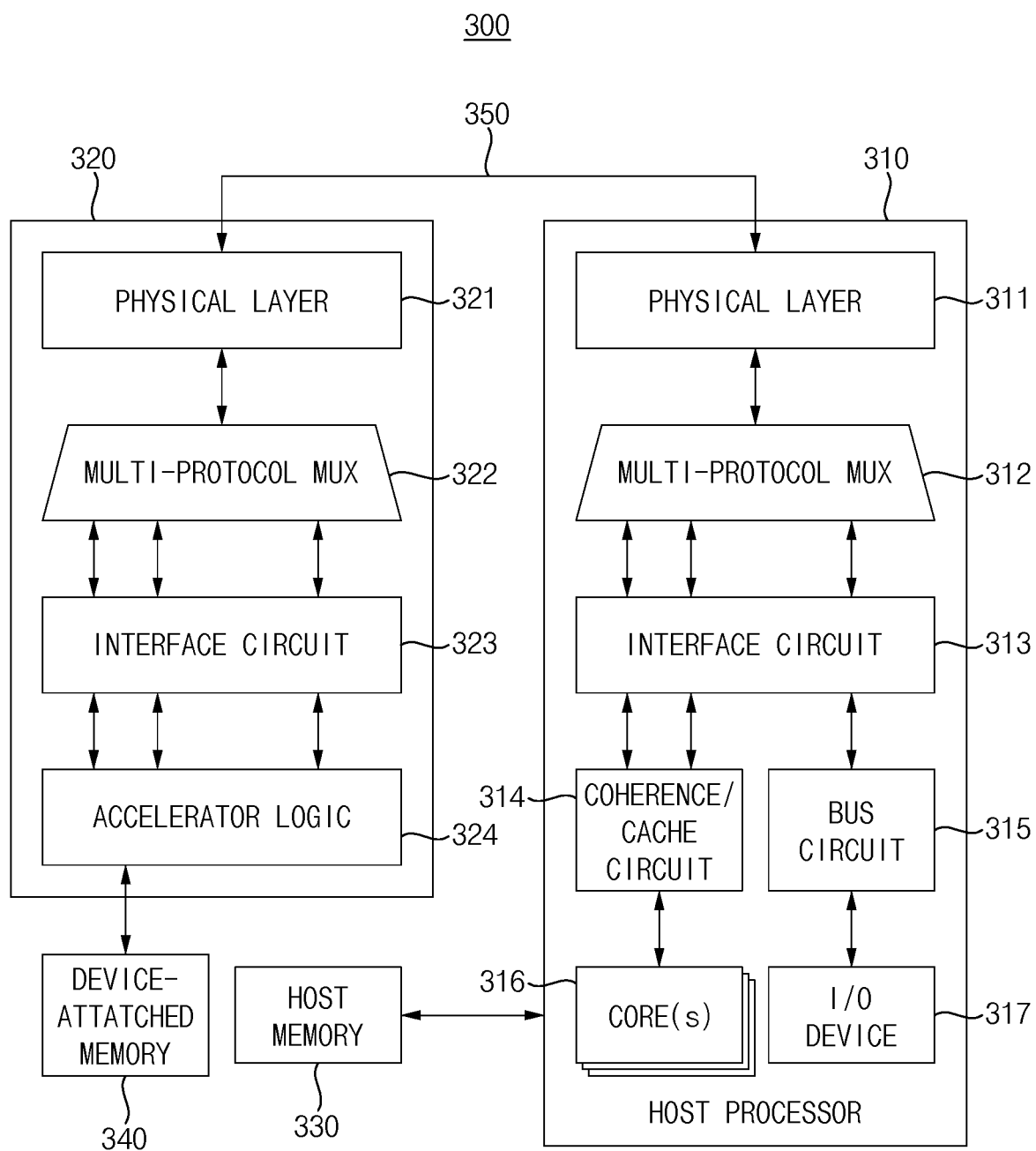
FIGS. 16 and 17 are diagrams illustrating example embodiments of a host included in a computing system according to example embodiments.
Figure 17:
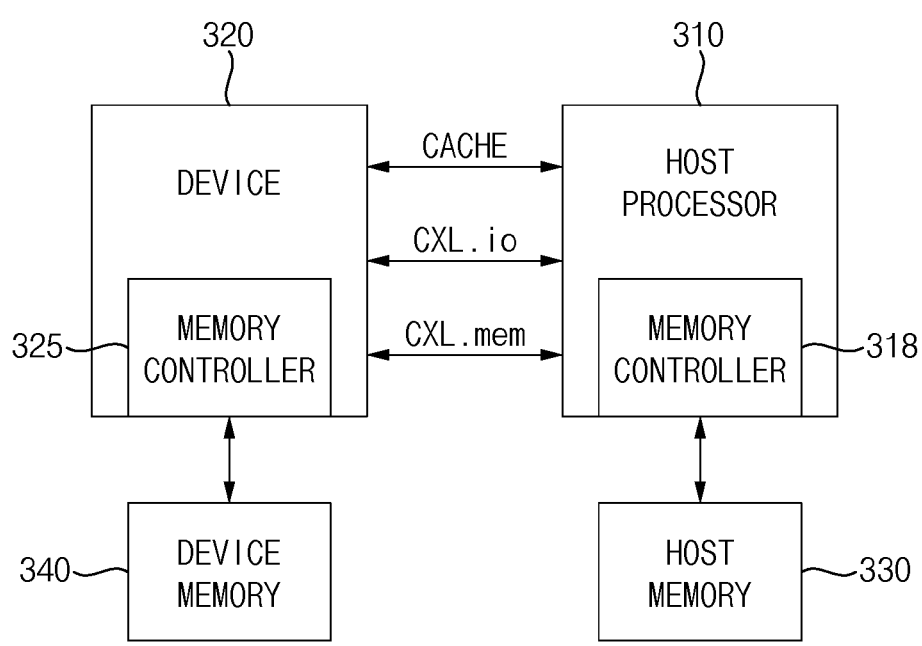

FIGS. 16 and 17 are diagrams illustrating example embodiments of a host included in a computing system according to example embodiments.

FIGS. 16 and 17 illustrate a CXL-protocol-based link as an example of an interconnect device between devices.

Referring to FIG. 16, a system 300 may include various types of host devices. Although a host processor 310 and an accelerator 320 (e.g., a GPU and an FPGA) are illustrated as examples in FIG. 16, embodiments are not limited thereto. Various other types of devices configured to transmit an access request may be applied to the system 300. The host processor 310 and the accelerator 320 may transmit or receive messages and/or data to and from each other through a link 350 configured to support a CXL protocol. In some example embodiments, the host processor 310, which is a main processor, may be a CPU configured to control all operations of the system 300.

In addition, the system 300 may further include a host memory 330 connected to the host processor 310 and a device memory 340 mounted at the accelerator 320. The host memory 330 connected to the host processor 310 may support cache coherency. The device memory 340 may be managed by the accelerator 320 independently of the host memory 330. The host memory 330 and the device memory 340 may be accessed by a plurality of host devices. As an example, the accelerator 320 and devices, such as an NIC, may access the host memory 330 in a PCIe DMA manner.

In some example embodiments, the link 350 may support a plurality of protocols (e.g., sub-protocols) defined in the CXL protocol, and messages and/or data may be transferred through the plurality of protocols. For example, the protocols may include a non-coherent protocol (or an I/O protocol CXL.io), a coherent protocol (or a cache protocol CXL.cacheCACHE), and a memory access protocol (or a memory protocol CXL.memoryCXL.mem).

The I/O protocol CXL.io may be an I/O protocol similar to PCIe. A shared memory (e.g., a pooled memory) included in the system 300 may communicate with the hosts based on the PCIe or the I/O protocol CXL.io. The memory device according to the example embodiment shown in FIG. 1 may be accessed by the host processor 310 and the accelerator 320 through an interconnect device based on PCIe or the I/O protocol CXL.io. In addition, the cache protocol CXL.cacheCACHE may provide a protocol via which the accelerator 320 may access the host memory 330, and the memory protocol CXL.memoryCXL.mem may provide a protocol via which the host processor 310 may access the device memory 340.

The accelerator 320 may refer to an arbitrary device configured to provide functions to the host processor 310. For example, at least some of computing operations and I/O operations executed on the host processor 310 may be offloaded to the accelerator 320. In some embodiments, the accelerator 320 may include any one or any combination of a programmable component (e.g., a GPU and an NPU), a component (e.g., an IP core) configured to provide a fixed function, and a reconfigurable component (e.g., an FPGA).

The accelerator 320 may include a physical layer 321, a multi-protocol multiplexer (MUX) 322, an interface circuit 323, and an accelerator logic 324 and may communicate with the device memory 340. The accelerator logic 324 may communicate with the host processor 310 through the multi-protocol MUX 322 and the physical layer 321 using the plurality of protocols.

The interface circuit 323 may determine one of the plurality of protocols based on messages and/or data for communication between the accelerator logic 324 and the host processor 310. The interface circuit 323 may be connected to at least one protocol queue included in the multi-protocol MUX 322 and transmit and receive messages and/or data to and from the host processor 310 through the at least one protocol queue.

The multi-protocol MUX 322 may include at least one protocol queue and transmit and receive messages and/or data to and from the host processor 310 through at least one protocol queue. In some example embodiments, the multi-protocol MUX 322 may include a plurality of protocol queues corresponding respectively to the plurality of protocols supported by the link 350. In some embodiments, the multi-protocol MUX 322 may arbitrate between communications of different protocols and perform communication based on a selected protocol.

The device memory 340 may be connected to the accelerator 320 and be referred to as a device-attached memory. The accelerator logic 324 may communicate with the device memory 340 based on a protocol (i.e., a device-specific protocol) that is independent of the link 350. In some embodiments, the accelerator 320 may include a controller, which is a component for accessing the device memory 340, and the accelerator logic 324 may access the device memory 340 through the controller. The controller may access the device memory 340 of the accelerator 320 and also, enable the host processor 310 to access the device memory 340 through the link 350. In some embodiments, the device memory 340 may correspond to a CXL-based device-attached memory.

The host processor 310 may be a main processor (e.g., a CPU) of the system 300. In some example embodiments, the host processor 310 may be a CXL-based host processor or host. As shown in FIG. 16, the host processor 310 may be connected to the host memory 330 and include a physical layer 311, a multi-protocol MUX 312, an interface circuit 313, a coherence/cache circuit 314, a bus circuit 315, at least one core 316, and an I/O device 317.

At least one core 316 may execute an instruction and be connected to the coherence/cache circuit 314. The coherence/cache circuit 314 may include a cache hierarchy and be referred to as a coherence/cache logic. As shown in FIG. 16, the coherence/cache circuit 314 may communicate with the at least one core 316 and the interface circuit 313. For example, the coherence/cache circuit 314 may enable communication through at least two protocols including a coherent protocol and a memory access protocol. In some example embodiments, the coherence/cache circuit 314 may include a DMA circuit. The I/O device 317 may be used to communicate with the bus circuit 315. For example, the bus circuit 315 may be a PCIe logic, and the I/O device 317 may be a PCIe I/O device.

The interface circuit 313 may enable communication between components (e.g., the coherence/cache circuit 314 and the bus circuit 315) of the host processor 310 and the accelerator 320. In some example embodiments, the interface circuit 313 may enable communication between the components of the host processor 310 and the accelerator 320 according to a plurality of protocols (e.g., the non-coherent protocol, the coherent protocol, and the memory protocol). For example, the interface circuit 313 may determine one of the plurality of protocols based on the messages and/or data for communication between the components of the host processor 310 and the accelerator 320.

The multi-protocol MUX 312 may include at least one protocol queue. The interface circuit 313 may be connected to the at least one protocol queue and transmit and receive messages and/or data to and from the accelerator 320 through the at least one protocol queue. In some example embodiments, the interface circuit 313 and the multi-protocol MUX 312 may be integrally formed into one component. In some embodiments, the multi-protocol MUX 312 may include a plurality of protocol queues corresponding respectively to the plurality of protocols supported by the link 350. In some embodiments, the multi-protocol MUX 312 may arbitrate communications of different protocols and provide selected communications to the physical layer 311.

Moreover, according to example embodiments, a request generator RQG of the host in FIG. 1 may correspond to various components shown in FIG. 16 or be included in the components. For example, functions of the request generator RQG may be performed by various components shown in FIG. 16, for example, the accelerator logic 324, the at least one core 316, and the I/O device 317.

FIG. 17 illustrates an example of a multi-protocol for communication in the computing system 200 of FIG. 16. Also, FIG. 17 illustrates an example in which each of the host processor 310 and the accelerator 320 includes a memory controller. The memory controller shown in FIG. 17 may include some of components included in each of the devices shown in FIG. 16 or be implemented separately from the components.

The host processor 310 may communicate with the accelerator 320 based on a plurality of protocols. According to the above-described CXL examples, the plurality of protocols may include a memory protocol CXL.memoryCXL.mem (or MEM), a coherent protocol CXL.cache (or CACHE), and a non-coherent protocol CXL.io (or IO). The memory protocol MEM may define transactions between a master and a subordinate. For example, the memory protocol MEM may define a transaction from the master to the subordinate and a transaction from the subordinate to the master. The coherent protocol CACHE may define interactions between the accelerator 320 and the host processor 310. For example, an interface of the coherent protocol CACHE may include three channels including a request, a response, and data. The non-coherent protocol IO may provide a non-coherent load/store interface for I/O devices.

The accelerator 320 may include a memory controller 325 configured to communicate with the device memory 340 and access the device memory 340. In some example embodiments, the memory controller 325 may be outside the accelerator 320 and integrated with the device memory 340. In addition, the host processor 310 may include a memory controller 318 configured to communicate with the host memory 330 and access the host memory 330. In some example embodiments, the memory controller 318 may be outside the host processor 310 and integrated with the host memory 330.

Figure 18:
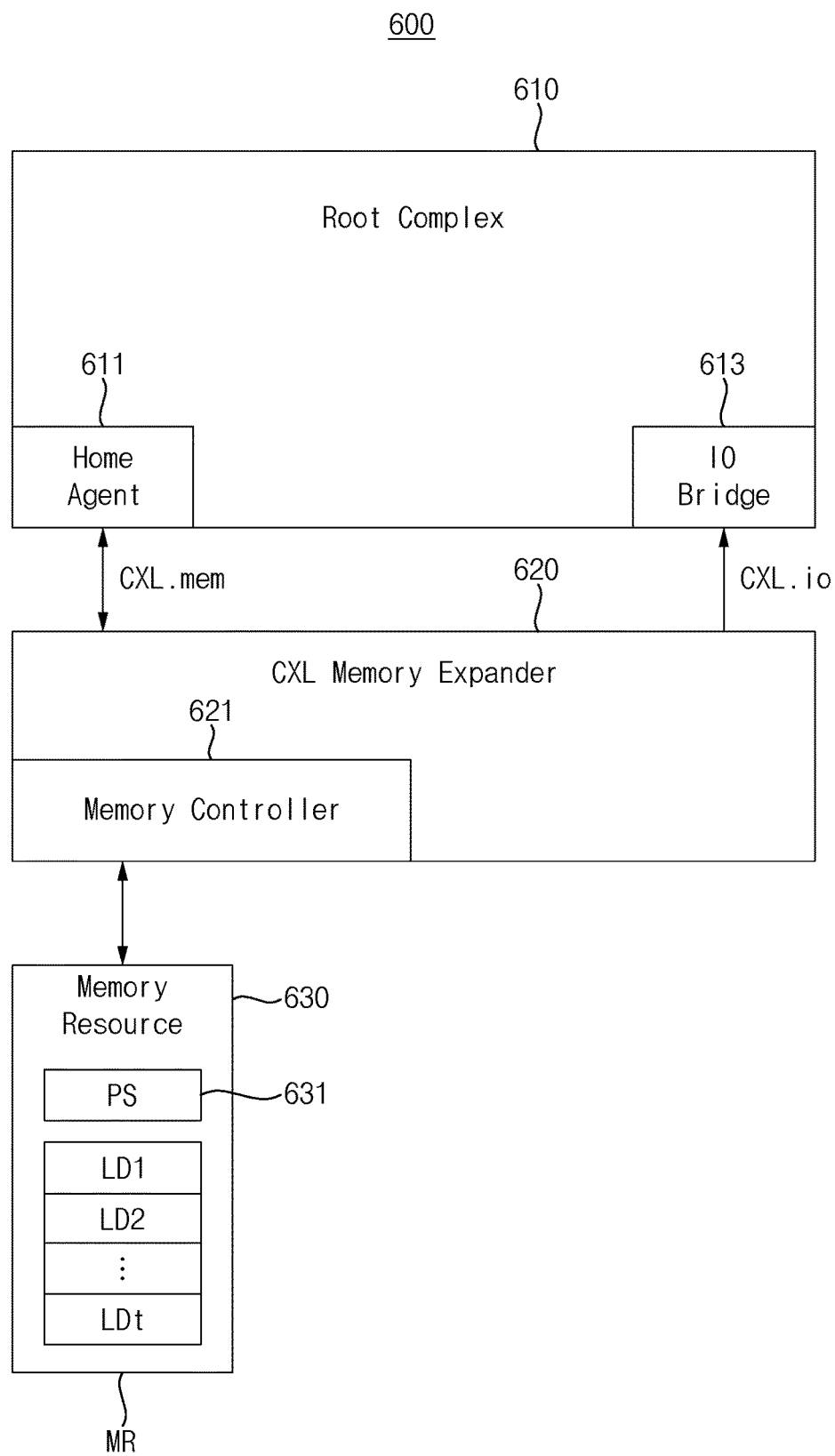
FIG. 18 is an example of a computing system when a memory device according to example embodiments corresponds to a Type 3 memory device defined by a CXL protocol.

FIG. 18 is an example of a computing system when a memory device according to example embodiments corresponds to a Type 3 memory device defined by a CXL protocol.

Referring to FIG. 18, a computing system 600 may include a root complex 610, a CXL memory expander 620 connected to the root complex 610 and a memory device 630.

The root complex 610 may include a home agent 611 and an I/O bridge 613, and the home agent 611 may communicate with the CXL memory expander 620 based on a coherent protocol CXL.mem and the I/O bridge 613 may communicate with the CXL memory expander 620 based on a non-coherent protocol, i.e., an I/O protocol CXL.io. In a CXL protocol base, the home agent 611 may correspond to an agent on a host side that is arranged to solve the entire consistency of the computing system 600 for a given address.

The CXL memory expander 620 may include a memory controller 621.

In addition, the CXL memory expander 620 may output data to the root complex 610 via the I/O bridge 613 based on the I/O protocol CXL.io or the PCIe.

The memory device 630 may include a memory region MR that is divided into a plurality of logical devices LD1, LD2, . . . , LDt and a priority scheduler 631. The priority scheduler 631 may designate a first host from a plurality of hosts connected to the root complex 610 as the priority host based on attribute information of each the plurality of hosts, may generate the output data by rearranging an internal data such that a data requested by the first host is output with priority and may provide the output data to all or some of the plurality of hosts.

Figure 19:
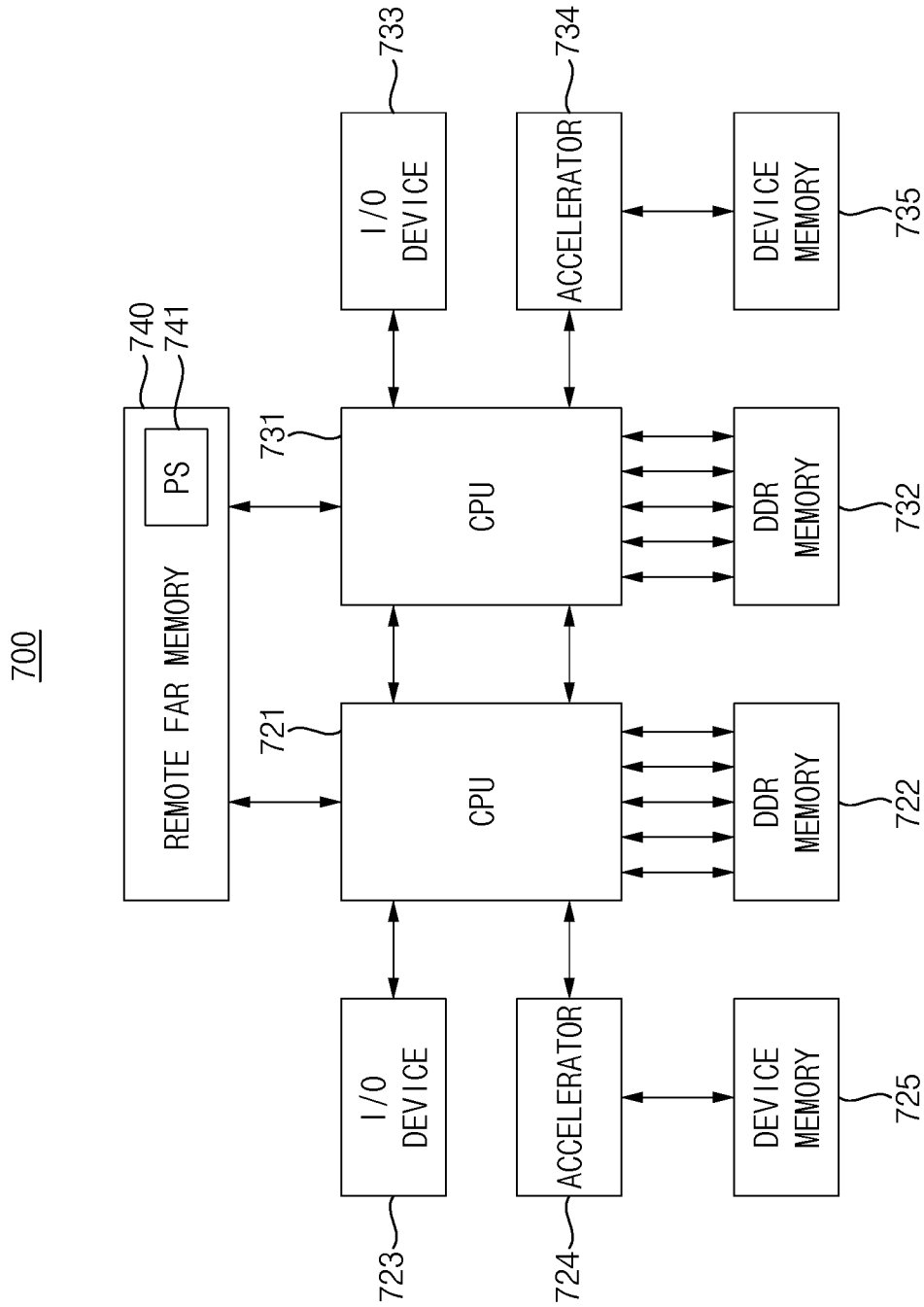
FIG. 19 is a block diagram illustrating a computing system according to example embodiments.

FIG. 19 is a block diagram illustrating a computing system according to example embodiments.

Referring to FIG. 19, a computing system (or, a system) 700 may include a first CPU 721 and a second CPU 731, a first DDR (double data rate) memory 722 and a second DDR memory 732 connected to the first CPU 721 and the second CPU 731, respectively. The first CPU 721 and the second CPU 731 may be connected through an interconnection system based on processor interconnection technology. The interconnection system shown in FIG. 19 may provide a at least one CPU-to-CPU coherent link between CPUs.

The system 700 may include a first input-output device 723 in communication with a first CPU 721 and a first accelerator 724, and a first device memory 725 coupled to the first accelerator 724. The first CPU 721 may communicate with the first input-output device 723 and the first accelerator 724 through a bus. In addition, the system 700 may include a second input-output device 733 and a second accelerator 734 in communication with the second CPU 731, and a second device memory 735 connected to the second accelerator 734. The second CPU 731 may communicate with the second input-output device 733 and the second accelerator 734 through a bus. In some example embodiments, at least one of first device memory 725 and the second device memory 735 may be omitted from the system 700.

The system 700 may also include a remote far memory 740. The first CPU 721 and the second CPU 731 may be respectively connected to the remote memory 740 through buses. The remote memory 740 may be used for memory expansion in system 700. In some example embodiments, the remote far memory 740 may be omitted from system 700.

The system 700 may perform communications based on at least some of a number of protocols over buses. Taking CXL as an example, information such as initial settings is transmitted based on the I/O protocol (CXL.io), data and/or messages are transmitted based on the cache protocol (CACHE) and/or memory protocol (CXL.mem).

In the system 700 shown in FIG. 19, the remote far memory 740 may be shared by at least two hosts. FIG. 19 shows that the first and second CPUs 721 and 731 share the remote far memory 740, but various other host devices may further share the remote far memory 740. When the memory device according to example embodiments is applied to the remote far memory 740, the remote far memory 740 may include a priority scheduler 741.

Figure 20:
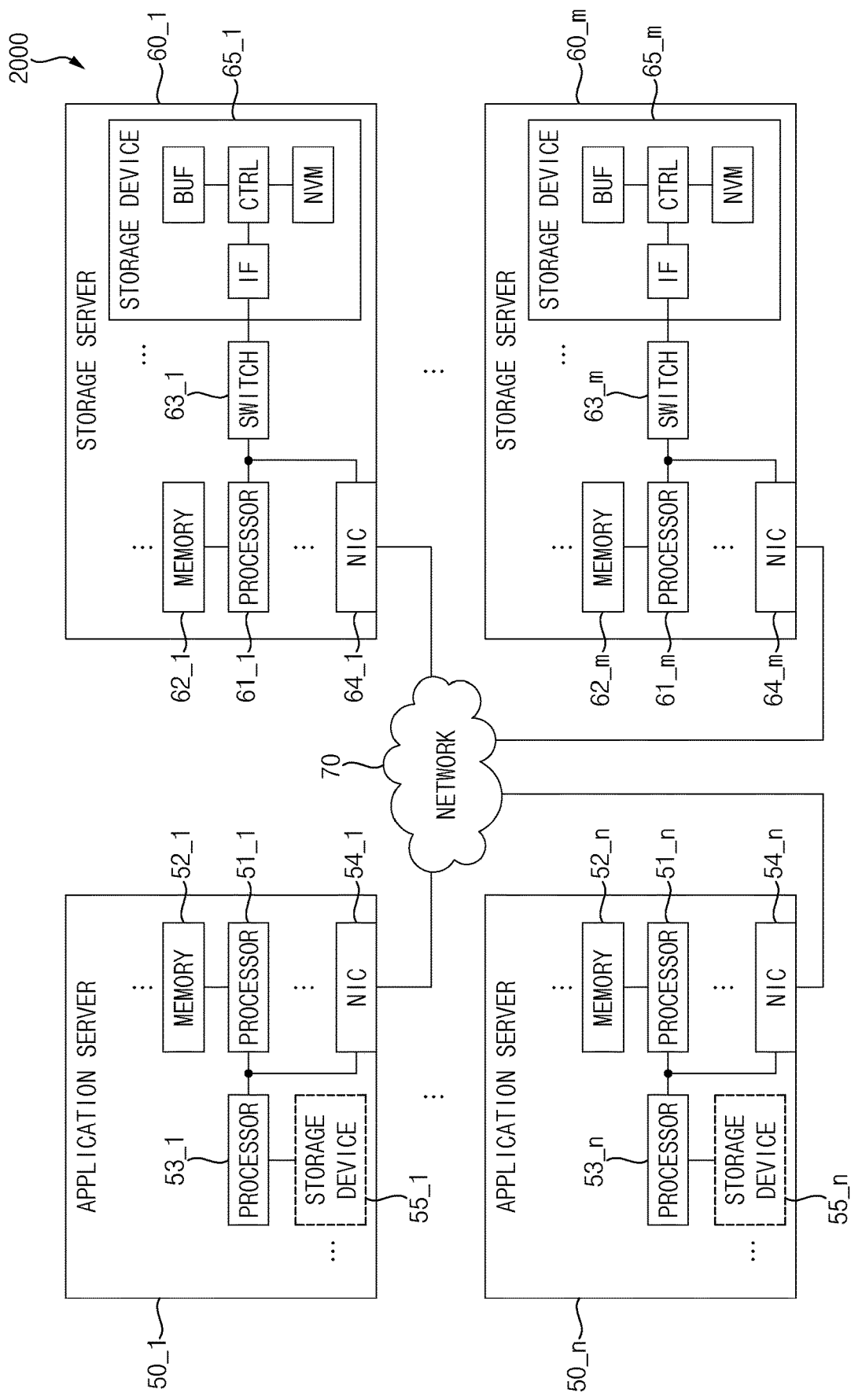
FIG. 20 is a block diagram illustrating a data center including a computing system according to example embodiments.

FIG. 20 is a block diagram illustrating a data center including a computing system according to example embodiments.

In some example embodiments, the system described above with reference to the drawings may serve as an application server and/or a storage server and be included in the data center 2000. In addition, the memory region allocation and/or the control of the signal transfer path according to example embodiments may be applied to each of the application server and/or the storage server.

Referring to FIG. 20, the data center 2000 may collect various pieces of data and provide services and be also referred to as a data storage center. For example, the data center 2000 may be a system configured to operate a search engine and a database or a computing system used by companies, such as banks, or government agencies. As shown in FIG. 25, the data center 2000 may include application servers 50_1 to 50_n and storage servers 60_1 to 60_m(here, each of m and n is an integer more than 1). The number n of application servers 50_1 to 50_n and the number m of storage servers 60_1 to 60_m may be variously selected according to embodiments. The number n of application servers 50_1 to 50_n may be different from the number m of storage servers 60_1 to 60m.

The application servers 50_1 to 50_n may include any one or any combination of processors 51_1 to 51_n, memories 52_1 to 52_n, switches 53_1 to 53_n, NICs 54_1 to 54_n, and storage devices 55_1 to 55_n. The processors 51_1 to 51_n may control all operations of the application servers 50_1 to 50_n, access the memories 52_1 to 52_n, and execute instructions and/or data loaded in the memories 52_1 to 52_n. Non-limiting examples of the memories 52_1 to 52_n may include DDR SDRAM, a high-bandwidth memory (HBM), a hybrid memory cube (HMC), a dual in-line memory module (DIMM), a Optane DIMM, or a non-volatile DIMM (NVDIMM).

According to example embodiments, the numbers of processors and memories included in the application servers 50_1 to 50_n may be variously selected according to embodiments. In some embodiments, the processors 51_1 to 51_n and the memories 52_1 to 52_n may provide processor-memory pairs. In some embodiments, the number of processors 51_1 to 51_n may be different from the number of memories 52_1 to 52_n. The processors 51_1 to 51_n may include a single core processor or a multi-core processor. In some embodiments, as illustrated with a dashed line in FIG. 20, the storage devices 55_1 to 55_n may be omitted from the application servers 50_1 to 50_n. The number of storage devices 55_1 to 55_n included in the storage servers 50_1 to 50_n may be variously selected according to embodiments. The processors 51_1 to 51_n, the memories 52_1 to 52_n, the switches 53_1 to 53_n, the NICs 54_1 to 54_n, and/or the storage devices 55_1 to 55_n may communicate with each other through a link described above with reference to the drawings.

The storage servers 60_1 to 60_m may include any one or any combination of processors 61_1 to 61_m, memories 62_1 to 62_m, switches 63_1 to 63_m, NICs 64_1 to 64_n, and storage devices 65_1 to 65m. The processors 61_1 to 61_m and the memories 62_1 to 62_m may operate similar to the processors 51_1 to 51_n and the memories 52_1 to 52_n of the application servers 50_1 to 50_n described above.

The application servers 50_1 to 50_n may communicate with the storage servers 60_1 to 60_m through a network 70. In some embodiments, the network 70 may be implemented using a fiber channel (FC) or Ethernet. The FC may be a medium used for relatively high-speed data transfer. An optical switch that provides high performance and high availability may be used as the FC. The storage servers 60_1 to 60_m may be provided as file storages, block storages, or object storages according to an access method of the network 70.

In some example embodiments, the network 70 may be a storage-only network, such as a storage area network (SAN). For example, the SAN may be an FC-SAN, which may use an FC network and be implemented using an FC Protocol (FCP). In another case, the SAN may be an Internet protocol (IP)-SAN, which uses a transmission control protocol/Internet protocol (TCP/IP) network and is implemented according to an SCSI over TCP/IP or Internet SCSI (iSCSI) protocol. In some embodiments, the network 70 may be a general network, such as a TCP/IP network. For example, the network 70 may be implemented according to a protocol, such as FC over Ethernet (FCOE), network attached storage (NAS), non-volatile memory express (NVMe) over fabrics (NVMe-oF).

The application server 50_1 and the storage server 60_1 will mainly be described below, but it may be noted that a description of the application server 50_1 may be also applied to another application server (e.g., 50_n), and a description of the storage server 60_1 may be also applied to another storage server (e.g., 60_m).

The application server 50_1 may store data, which is requested to be stored by a user or a client, in one of the storage servers 60_1 to 60_m through the network 70. In addition, the application server 50_1 may obtain data, which is requested to be read by the user or the client, from one of the storage servers 60_1 to 60_m through the network 70. For example, the application server 50_1 may be implemented as a web server or a database management system (DBMS).

The application server 50_1 may access the memory 52_n and/or the storage device 55_n included in another application server 50_n, through the network 70, and/or access the memories 62_1 to 62_m and/or the storage devices 65_1 to 65_m included in the storage servers 60_1 to 60_m, through the network 70. Accordingly, the application server 50_1 may perform various operations on data stored in the application servers 50_1 to 50_n and/or the storage servers 60_1 to 60_m. For example, the application server 50_1 may execute an instruction to migrate or copy data between the application servers 50_1 to 50_n and/or the storage servers 60_1 to 60_m. In this case, the data may be migrated from the storage devices 65_1 to 65_m of the storage servers 60_1 to 60_m to the memories 52_1 to 52_n of the application servers 50_1 to 50_n through the memories 62_1 to 62_m of the storage servers 60_1 to 60_m or directly. In some embodiments, the data migrated through the network 70 may be encrypted data for security or privacy.

In the storage server 60_1, an interface IF may provide physical connection between the processor 61_1 and a controller CTRL and physical connection between the NIC 64_1 and the controller CTRL. For example, the interface IF may be implemented using a direct attached storage (DAS) method in which the storage device 65_1 is directly connected to a dedicated cable. For example, the interface IF may be implemented using various interface methods, such as advanced technology attachment (ATA), serial ATA (SATA), external SATA (e-SATA), small computer small interface (SCSI), serial attached SCSI (SAS), PCI, PCIe, NVMe, IEEE 1394, a universal serial bus (USB), a secure digital (SD) card, a multi-media card (MMC), an embedded MMC (eMMC), a UFS, an embedded UFS (eUFS), and a compact flash (CF) card interface.

In the storage server 60_1, the switch 63_1 may selectively connect the processor 61_1 to the storage device 65_1 or selectively connect the NIC 64_1 to the storage device 65_1 based on the control of the processor 61_1.

In some example embodiments, the NIC 64_1 may include a network interface card (NIC) and a network adaptor. The NIC 54_1 may be connected to the network 70 through a wired interface, a wireless interface, a bluetooth interface, or an optical interface. The NIC 54_1 may include an internal memory, a digital signal processor (DSP), and a host bus interface and be connected to the processor 61_1 and/or the switch 63_1 through the host bus interface. In some embodiments, the NIC 64_1 may be integrated with any one or any combination of the processor 61_1, the switch 63_1, and the storage device 65_1.

In the application servers 50_1 to 50_n or the storage servers 60_1 to 60_m, the processors 51_1 to 51_m and 61_1 to 61_n may transmit commands to the storage devices 55_1 to 55_n and 65_1 to 65m or the memories 52_1 to 52_n and 62_1 to 62_m and program or read data. In this case, the data may be data of which an error is corrected by an error correction code (ECC) engine. The data may be data processed with data bus inversion (DBI) or data masking (DM) and include cyclic redundancy Code (CRC) information. The data may be encrypted data for security or privacy.

In response to read commands received from the processors 51_1 to 51_m and 61_1 to 61_n, the storage devices 55_1 to 55_n and 65_1 to 65_m may transmit control signals and command/address signals to a non-volatile memory device (e.g., a NAND flash memory device) NVM. The storage devices 55_1 to 55_n and 65_1 to 65_m may process the commands according to the various embodiments described above, for example, by prioritizing particular processors and for data access. Accordingly, when data is read from the non-volatile memory device NVM, a read enable signal may be input as a data output control signal to output the data to a DQ bus. A data strobe signal may be generated using the read enable signal. The command and the address signal may be latched according to a rising edge or falling edge of a write enable signal.

The controller CTRL may control all operations of the storage device 65_1. In embodiments, the controller CTRL may include static RAM (SRAM). The controller CTRL may write data to the non-volatile memory device NVM in response to a write command or read data from the non-volatile memory device NVM in response to a read command. For example, the write command and/or the read command may be generated based on a request provided from a host (e.g., the processor 61_1 of the storage server 60_1, the processor 61_m of another storage server 60_m, or the processors 51_1 to 51_n of the application servers 50_1 to 50_n). A buffer BUF may temporarily store (or buffer) data to be written to the non-volatile memory device NVM or data read from the non-volatile memory device NVM. In some embodiments, the buffer BUF may include DRAM. The buffer BUF may store metadata. The metadata may refer to user data or data generated by the controller CTRL to manage the non-volatile memory device NVM. The storage device 65_1 may include a secure element (SE) for security or privacy.

The present disclosure may be applied to various electronic devices and systems that include high storage capacity memory devices. For example, the present disclosure may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:

1. A memory device configured to connect to a plurality of hosts through an interconnect device and to communicate with the plurality of hosts by a compute express link (CXL) protocol, the memory device comprising:
    a command scheduler configured to schedule commands included in requests from the plurality of hosts;
    a memory configured to generate internal data by performing memory operations corresponding to the scheduled commands; and
    a priority scheduler configured to:
        designate a first host from the plurality of hosts as a priority host based on attribute information of each of the plurality of hosts; and
        generate output data by rearranging the internal data such that a data requested by the first host is output with priority.

2. The memory device of claim 1, comprising:
    a controller including the command scheduler and the priority scheduler,
    wherein the priority scheduler is configured to receive packets from the plurality of hosts, and
    wherein each of the packets includes a respective one of the requests and a host identifier that identifies a respective one of the plurality of hosts.

3. The memory device of claim 2, wherein the priority scheduler includes:
    a host information register configured to store the attribute information of each of the plurality of hosts based on the packets; and
    a priority mode selector configured to generate a priority mode signal indicating that the first host is designated as the priority host based on the attribute information stored in the host information register.

4. The memory device of claim 3, wherein the host information register is configured to store an access count based on a respective one of the requests and an allocation amount based on a device logical address included in a respective one of the requests as the attribute information for a respective one of the plurality of hosts, and
    wherein the access count indicates a number of accesses required by respective one of the requests and the allocation amount indicates an amount of logical memory regions allocated for respective one of the requests.

5. The memory device of claim 4, wherein the priority mode selector is configured to generate the priority mode signal based on the access count and the allocation amount stored in the host information register such that the data requested by the first host is output with priority.

6. The memory device of claim 3, wherein the priority scheduler further includes:
    an arbiter configured to rearrange the internal data in response to the priority mode signal;
    a first buffer configured to buffer the internal data and provide the buffered data to the arbiter; and
    a second buffer configured to provide the output data by buffering rearranged data output from the arbiter.

7. The memory device of claim 3, wherein the controller further includes:
    an arbiter configured to rearrange the internal data in response to the priority mode signal;
    a first buffer configured to buffer the internal data and provide the buffered data to the arbiter; and
    a second buffer configured to provide the output data by buffering rearranged data output from the arbiter.

8. The memory device of claim 3, wherein the memory includes:
    a plurality of chips; and
    a plurality of data buffers corresponding to the plurality of chips, the plurality of data buffers configured to buffer the internal data.

9. The memory device of claim 3, wherein the controller further includes:
    an arbiter configured to rearrange the internal data in response to the priority mode signal; and
    a buffer configured to provide the output data by buffering rearranged data output from the arbiter.

10. The memory device of claim 1, wherein the memory includes a memory region, and
    wherein the memory region is divided into a plurality of logical devices that are shared by the plurality of hosts.

11. A computing system comprising:
    an interconnect device;
    a plurality of memory devices connected to the interconnect device; and
    a plurality of hosts connected to the interconnect device and configured to generate requests for access to the plurality of memory devices,
    wherein the plurality of memory devices are configured to communicate with the plurality of host by a compute express link (CXL) protocol, and wherein each of the plurality of memory devices includes:
- a command scheduler configured to schedule commands included in the requests from the plurality of hosts;
- a memory configured to generate internal data by performing memory operations corresponding to the scheduled commands; and
- a priority scheduler configured to designate a first host from the plurality of hosts as a priority host based on attribute information of each of the plurality of hosts, and generate an output data by rearranging the internal data such that a data requested by the first host is output with priority.

12. The computing system of claim 11, wherein each of the plurality of memory devices includes:
- a controller including the command scheduler and the priority scheduler,
- wherein the priority scheduler is configured to receive packets from the plurality of hosts, and
- wherein each of the packets includes a respective one of the requests and a host identifier that identifies a respective one of the plurality of hosts.

13. The computing system of claim 12, wherein the priority scheduler includes;
- a host information register configured to store the attribute information of each of the plurality of hosts based on the packets; and
- a priority mode selector configured to generate a priority mode signal indicating that the first host is designated as the priority host based on the attribute information stored in the host information register, and
- wherein the host information register is configured to store an access count based on respective one of the requests and an allocation amount based on a device logical address included in respective one of the requests as the attribute information with respective to respective one of the plurality of hosts.

14. The computing system of claim 13, wherein the priority mode selector is configured to generate the priority mode signal based on the access count and the allocation amount stored in the host information register such that the data requested by the first host is output with priority.

15. The computing system of claim 13, wherein the priority scheduler further includes:
- an arbiter configured to rearrange the internal data in response to the priority mode signal;
- a first buffer configured to buffer the internal data and provide the buffered data to the arbiter; and
- a second buffer configured to provide the output data by buffering rearranged data output from the arbiter.

16. The computing system of claim 11,
- wherein the interconnect device includes a CXL switch including a fabric manager configured to manage connection relationships between the plurality of hosts and the plurality of memory devices, and
- wherein the memory includes a memory region that is divided into a plurality of logical devices shared by the plurality of hosts.

17. The computing system of claim 11, wherein each of the plurality of memory devices includes a dynamic random access memory (DRAM).

18. The computing system of claim 11, wherein each of plurality of memory devices includes a chiplet.

19. The computing system of claim 11, wherein each of plurality of memory devices includes a memory module.

20. A memory device configured to connect to a plurality of hosts through an interconnect device and to communicate with the plurality of hosts by a compute express link (CXL) protocol, the memory device comprising:
- a command scheduler configured to schedule commands included in requests from the plurality of hosts;
- a memory configured to generate internal data by performing memory operations corresponding to the scheduled commands; and
- a priority scheduler configured to:
  - designate a first host from the plurality of hosts as a priority host based on attribute information of each of the plurality of hosts; and
  - generate an output data by rearranging the internal data such that a data requested by the first host is output with priority,
- wherein the priority scheduler includes:
  - a host information register configured to store the attribute information of each of the plurality of hosts based on information in received packets;
  - a priority mode selector configured to generate a priority mode signal based on the attribute information stored in the host information register; and
  - an arbiter configured to generate the output data by rearranging the internal data in response to the priority mode signal.

* * * * *